United States Patent
Cho et al.

(10) Patent No.: US 10,805,375 B2
(45) Date of Patent: Oct. 13, 2020

(54) USER TERMINAL DEVICE, METHOD AND NETWORK SYSTEM FOR DISPLAYING WEBPAGE

(71) Applicant: Samsung Electronics Co., Ltd., Suwon-si, Gyeonggi-do (KR)

(72) Inventors: Chi-hyun Cho, Seoul (KR); Kil-su Eo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 14/524,101

(22) Filed: Oct. 27, 2014

(65) Prior Publication Data
US 2015/0134732 A1 May 14, 2015

(30) Foreign Application Priority Data
Nov. 11, 2013 (KR) .................. 10-2013-0136447

(51) Int. Cl.
*H04L 29/08* (2006.01)
*H04W 12/08* (2009.01)
(Continued)

(52) U.S. Cl.
CPC .............. *H04L 67/02* (2013.01); *H04L 67/14* (2013.01); *H04W 4/08* (2013.01); *H04W 12/08* (2013.01); *H04W 12/00403* (2019.01)

(58) Field of Classification Search
None
See application file for complete search history.

(56) References Cited

U.S. PATENT DOCUMENTS 8,346,868 B2   1/2013  Nakajima
2006/0053196 A1*  3/2006  Spataro ................ H04L 65/403
                                                              709/205
(Continued)

FOREIGN PATENT DOCUMENTS

CN    103327454 A   9/2013
EP    2 642 773 A2   9/2013
(Continued)

OTHER PUBLICATIONS

Chinese Office Action with English translation dated Dec. 5, 2018; Chinese Appln. No. 201410642766.X.
(Continued)

*Primary Examiner* — Jason D Recek
*Assistant Examiner* — Lesa M Kennedy
(74) *Attorney, Agent, or Firm* — Jefferson IP Law, LLP

(57) ABSTRACT

A terminal apparatus for displaying a web page, a method and a network system thereof are provided. The web page display method of the terminal apparatus includes displaying the web page, transmitting information of the displayed web page to at least one peripheral terminal apparatus such that the web page may be displayed on the at least one peripheral terminal apparatus, one of changing and editing the web page according to first control information regarding the web page, transmitting the first control information to the at least one peripheral terminal apparatus, receiving second control information regarding the web page from the at least one peripheral terminal apparatus, and one of changing and editing the web page according to the second control information.

20 Claims, 21 Drawing Sheets

(51) Int. Cl.
*H04W 4/08* (2009.01)
*H04W 12/00* (2009.01)

(56) References Cited

U.S. PATENT DOCUMENTS

| | | | |
|---|---|---|---|
| 2006/0089978 A1* | 4/2006 | Lee | H04M 3/567 709/219 |
| 2010/0306642 A1* | 12/2010 | Lowet | G06F 17/30873 715/234 |
| 2012/0185784 A1* | 7/2012 | Katz | G06F 16/954 715/760 |
| 2013/0007290 A1* | 1/2013 | Yang | H04L 12/6418 709/227 |
| 2013/0103797 A1 | 4/2013 | Park et al. | |
| 2013/0132501 A1* | 5/2013 | Vandwalle | H04L 67/104 709/208 |
| 2013/0252656 A1* | 9/2013 | Lee | H04W 4/08 455/519 |
| 2013/0339536 A1* | 12/2013 | Burckart | H04L 12/1813 709/229 |
| 2014/0032633 A1* | 1/2014 | Kleppner | G06F 17/241 709/202 |
| 2015/0006671 A1* | 1/2015 | Feng | H04L 67/02 709/217 |
| 2015/0304330 A1* | 10/2015 | Soamboonsrup | G09B 5/08 726/4 |

FOREIGN PATENT DOCUMENTS

| | | |
|---|---|---|
| JP | 2004-178268 A | 6/2004 |
| JP | 5251717 B2 | 4/2013 |
| KR | 10-2001-0073342 A | 8/2001 |
| KR | 10-2005-0043176 A | 5/2005 |
| KR | 10-0661509 B1 | 12/2006 |
| KR | 10-2009-0036035 A | 4/2009 |
| KR | 10-1153059 B1 | 6/2012 |
| KR | 10-2013-0017334 A | 2/2013 |
| KR | 10-2013-0043935 A | 5/2013 |

OTHER PUBLICATIONS

Chinese Office Action dated Aug. 6, 2019, issued in Chinese Patent Application No. 201410642766.X.

Korean Office Action dated Aug. 28, 2019, issued in Korean Patent Application No. 10-2013-0136447.

Chinese Office Action dated May 8, 2019; Application #: 201410642766.X.

Chinese Office Action dated Feb. 6, 2020, issued in Chinese Patent Application No. 201410642766.X.

* cited by examiner

USER TERMINAL DEVICE, METHOD AND NETWORK SYSTEM FOR DISPLAYING WEBPAGE

CROSS-REFERENCE TO RELATED APPLICATION(S)

This application claims the benefit under 35 U.S.C. § 119(a) of a Korean patent application filed on Nov. 11, 2013 in the Korean Intellectual Property Office and assigned Serial number 10-2013-0136447, the entire disclosure of which is hereby incorporated by reference.

TECHNICAL FIELD

The present disclosure relates to a terminal apparatus for displaying a web page, and a method and network system thereof. More particularly, the present disclosure relates to a terminal apparatus for displaying a web page shared in a plurality of terminal apparatuses, and a method and network system thereof.

BACKGROUND

As various web services become available, a user may share a web page being displayed on his/her terminal apparatus with other users nearby. That is, at a user's request, a terminal apparatus that is a master apparatus may share a web page that is currently being executed with at least one peripheral terminal apparatus that is a slave terminal apparatus.

There is another web page sharing method, that is, a method where a terminal apparatus shares a web page with a peripheral terminal apparatus through a sharing agent program. More specifically, with the terminal apparatus connected to the peripheral terminal apparatus, when an event for a web page request occurs, the terminal apparatus transmits an event signal for a web page request to the peripheral terminal apparatus through the sharing agent program. Accordingly, the peripheral terminal apparatus may request the same web page as the web page that the terminal apparatus requested from a web server based on the event signal.

However, in such a web page sharing method, when an event for a web page request occurs in the terminal apparatus and the peripheral terminal apparatus at the same time, the user of each terminal apparatus has an inconvenience of receiving an unwanted web page. Not only that, as described above, such a web page sharing method provides only the function of sharing a web page between terminal apparatuses, but is unable to share a control command input for a web page being shared between terminal apparatuses.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide efficiently sharing a web page in a plurality of terminal apparatuses.

In accordance with an aspect of the present disclosure, a web page display method of a terminal apparatus is provided. The web page display method includes displaying the web page, transmitting information of the displayed web page to at least one peripheral terminal apparatus such that the web page may be displayed on the at least one peripheral terminal apparatus, one of changing and editing the web page according to first control information regarding the web page, transmitting the first control information to the at least one peripheral terminal apparatus, receiving second control information regarding the web page from the at least one peripheral terminal apparatus, and one of changing and editing the web page according to the second control information.

In accordance with another aspect of the present disclosure, a terminal apparatus configured to display a web page is provided. The terminal apparatus includes an input unit configured to receive an input of a control manipulation command, a communicator configured to perform communication with at least one peripheral terminal apparatus, a displayer configured to display the web page, and a controller configured to transmit information of the displayed web page to the at least one peripheral terminal apparatus so that the at least one peripheral terminal apparatus displays the web page, changing or editing the web page according to first control information regarding the web page and transmitting the first control information to the at least one peripheral terminal apparatus, and in response to receiving second control information regarding the web page from the at least one peripheral terminal apparatus, changing or editing the web page according to the second control information.

In accordance with another aspect of the present disclosure, a web page display method of a network system including a plurality of terminal apparatuses performing communication between one another is provided. The method includes displaying a same web page on each of the plurality of terminal apparatuses, and synchronizing, in response to a control manipulation regarding the web page being input in one of the plurality of terminal apparatuses, one of changing and editing the web page according to the control manipulation, wherein the control manipulation may be input to each of the plurality of terminal apparatuses.

As described above, according to various embodiments of the present disclosure, it is not only possible to share a same web page between a plurality of terminal apparatuses, but also perform control sharing such as changing or editing of a shared web page in a plurality of terminal apparatuses.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
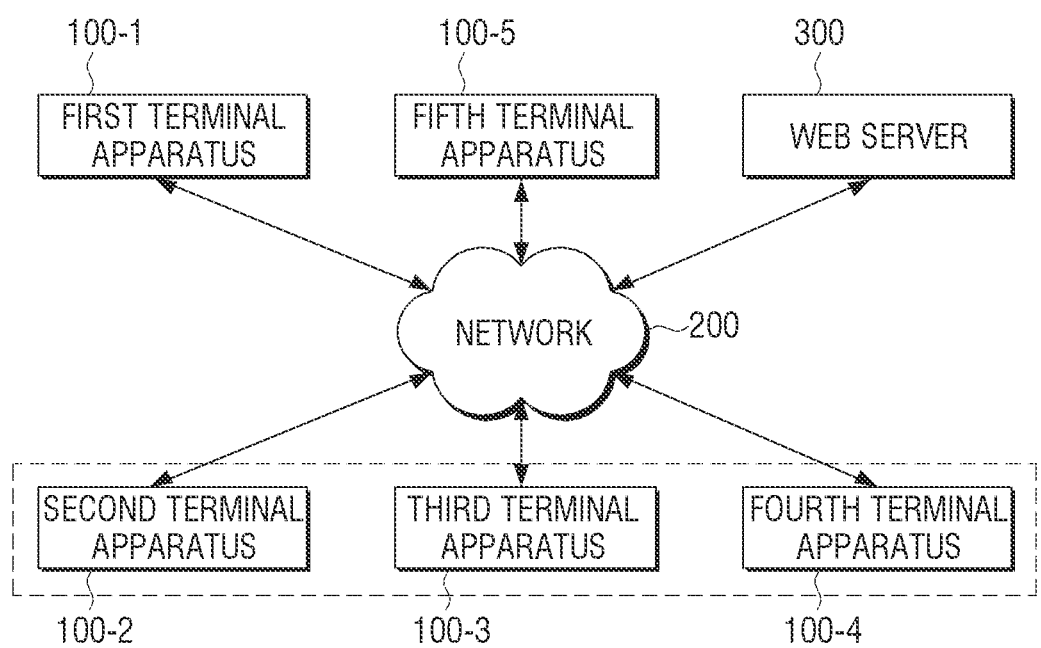
FIG. 1 is a view illustrating a configuration of a network system for sharing a web page according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, like drawing reference numerals are used for the like elements, even in different drawings. The matters defined in the description, such as detailed construction and elements, are provided to assist in a comprehensive understanding of various embodiments. However, various embodiments may be practiced without those specifically defined matters. Also, well-known functions or constructions are not described in detail since they would obscure the application with unnecessary detail.

FIG. 1 is a view illustrating a configuration of a network system for sharing a web page according an embodiment of the present disclosure.

Referring to FIG. 1, a network system for sharing a web page includes first to fifth terminal apparatuses 100-1 to 100-5, communication network 200, and a web server 300.

The first to fifth terminal apparatuses 100-1 to 100-5 are terminal apparatuses that may perform wired or wireless communication, such as a smart phone and smart TV, and the first to fifth terminal apparatuses 100-1 to 100-5 may perform synchronization with other peripheral terminal apparatuses via wired or wireless communication and share a web page provided from the web server 300.

The communication network 200 provides a route for the first to fifth terminal apparatuses 100-1 to 100-5 to access the web server 300 or for data communication between the first to fifth terminal apparatuses 100-1 to 100-5. When such a communication network 200 is a wired network, it may be established as an Internet Protocol (IP) network, and when the communication network 200 is a wireless network, it may be established as a short distance or optical wireless communication network.

Furthermore, the web server 300 is a server that provides a web page to the first to fifth terminal apparatuses 100-1 to 100-5 through the communication network 200.

More specifically, of the first to fifth terminal apparatuses 100-1 to 100-5, the first terminal apparatus 100-1 may access the web server 300 through the communication network 200, and receive a web page that a user requested and display the received web page. With the web page being displayed, the first terminal apparatus 100-1 may share the web page currently being provided from the web server 300 with at least one peripheral terminal apparatus that is grouped with a group of the peripheral terminal apparatuses at a user's request.

As illustrated, of the second to fifth terminal apparatuses 100-2 to 100-5, the second to fourth terminal apparatuses 100-2 to 100-4 may be grouped with a same group as the first terminal apparatus 100-1. Therefore, to share a same web page with the second to fourth terminal apparatuses 100-2 to 100-4 that are group to a same group, the first terminal apparatus 100-1 transmits address information regarding a web page currently being displayed to the second to fourth terminal apparatuses 100-2 to 100-4. The second to fourth terminal apparatuses 100-2 to 100-4 that received such address information access the web server 300 through the communication network 200, and requests a corresponding web page based on the received address information and receives the requested corresponding web page. Therefore, the first terminal apparatus 100-1 and the second to fourth terminal apparatuses 100-2 to 100-4 are grouped with a same group as the first terminal apparatus 100-1 may receive a same web page from the web server 300 and display the received web page.

When a control manipulation regarding a web page being displayed on one of the first to fourth terminal apparatuses 100-1 to 100-4 that display a same web page is input, each of the first to fourth terminal apparatuses 100-1 to 100-4 may change or edit the web page being displayed according to the input control manipulation.

According to an embodiment, of the first to fourth terminal apparatuses 100-1 to 100-4, the first terminal apparatus 100-1 may be granted a control authority regarding a corresponding web page. When a control manipulation regarding a web page currently being displayed is input, the first terminal apparatus 100-1 granted with the control manipulation performs changing or editing of the web page based on the input control manipulation. Prior to changing or editing the web page based on the control manipulation, the first terminal apparatus 100-1 transmits a control signal regarding the input control manipulation to the second to fourth terminal apparatuses 100-2 to 100-4 grouped with a same group. Accordingly, the second to fourth terminal apparatuses 100-2 to 100-4 may perform changing or editing of the web page currently being displayed based on the control signal received from the first terminal apparatus 100-1.

Above, was schematic explanation on sharing a web page between terminal apparatuses group within a same group in a network system for sharing a web page and operations of performing changing or editing of the shared web page.

Hereinafter, sharing a web page between terminal apparatuses grouped within a same group in a network system and a method for performing changing or editing a shared web page will be explained.

Figure 2:
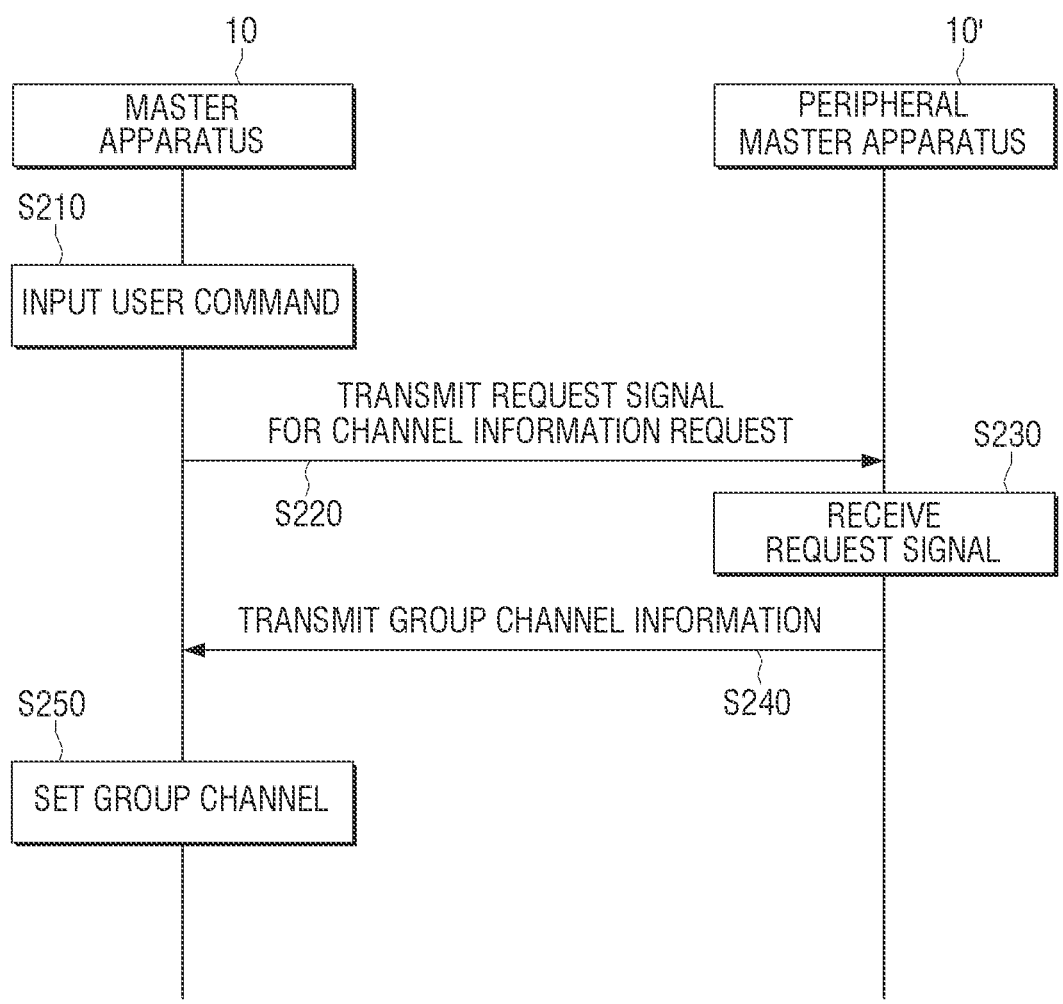
FIG. 2 is a process view for setting a group channel for sharing a web page between a master apparatus and a peripheral terminal apparatus of a network system according to an embodiment of the present disclosure.

FIG. 2 is a process view of setting a group channel for sharing a web page with a peripheral terminal apparatus in a master apparatus of a network system according to an embodiment of the present disclosure.

Referring to FIG. 2, a master apparatus 10 may be a terminal apparatus that accesses a web server 300 through a communication network 200 and receives a web page that a user requested and displays the received web page, as the first terminal apparatus 100-1 as described above. While displaying the web page that the user requested through the web server 300, the master apparatus 10 may receive an input of a user command for sharing a corresponding web page from the user at operation S210. When such a user command is input, the master apparatus 10 sets a group channel for grouping to a same group as the peripheral terminal apparatus. For this purpose, the master apparatus 10 creates a request signal for requesting group channel information regarding the preset group channel and transmits the request signal by transmitting at operation S220. The master apparatus 10 transmits the request signal for requesting the group channel information by transmitting through a common use channel receivable in all peripheral terminal apparatuses.

The request signal may include a channel request message for requesting address information of the master apparatus 10, and serial information and group channel information of the master apparatus 10. Furthermore, the common user channel may be a channel that performs communication through short distance wireless communication in all the peripheral terminal apparatuses. Through such a common use channel, the master apparatus 10 and at least one peripheral terminal apparatus may communicate information for web page sharing.

The master apparatus 10 transmits a request signal for requesting group channel information to peripheral terminal apparatuses within a preset critical range to by transmitting through such a common user channel, and accordingly, the master apparatus 10 and at least one peripheral terminal apparatus within the preset range may receive the request signal transmitted from the master apparatus 10. Of the peripheral terminal apparatuses that received such a request signal, the peripheral terminal apparatus that preset the group channel (hereinafter referred to as a peripheral master apparatus) may transmit the group channel information regarding the preset group channel to the master apparatus 10 through the common use channel. More specifically, as illustrated in FIG. 2, when the request signal transmitted from the master apparatus 10 through transmitting is received, the peripheral master apparatus 10' transmits the preset group channel information through the common use channel at operations S230 and S240. The group channel information may include address information, serial information and transmit port information of the peripheral master apparatus 10' that transmitted the group channel information.

The master apparatus 10 sets a group channel regarding an available channel based on the transmit port information included in the group channel information received from the peripheral master apparatus 10' through the common use channel at operation S250. When such a group channel is set, the master apparatus 10 may set at least one peripheral terminal apparatus of a plurality of peripheral terminal apparatuses within the preset critical range in a same group, and share a web page with the at least one peripheral terminal apparatus set in the same group.

Figure 3:
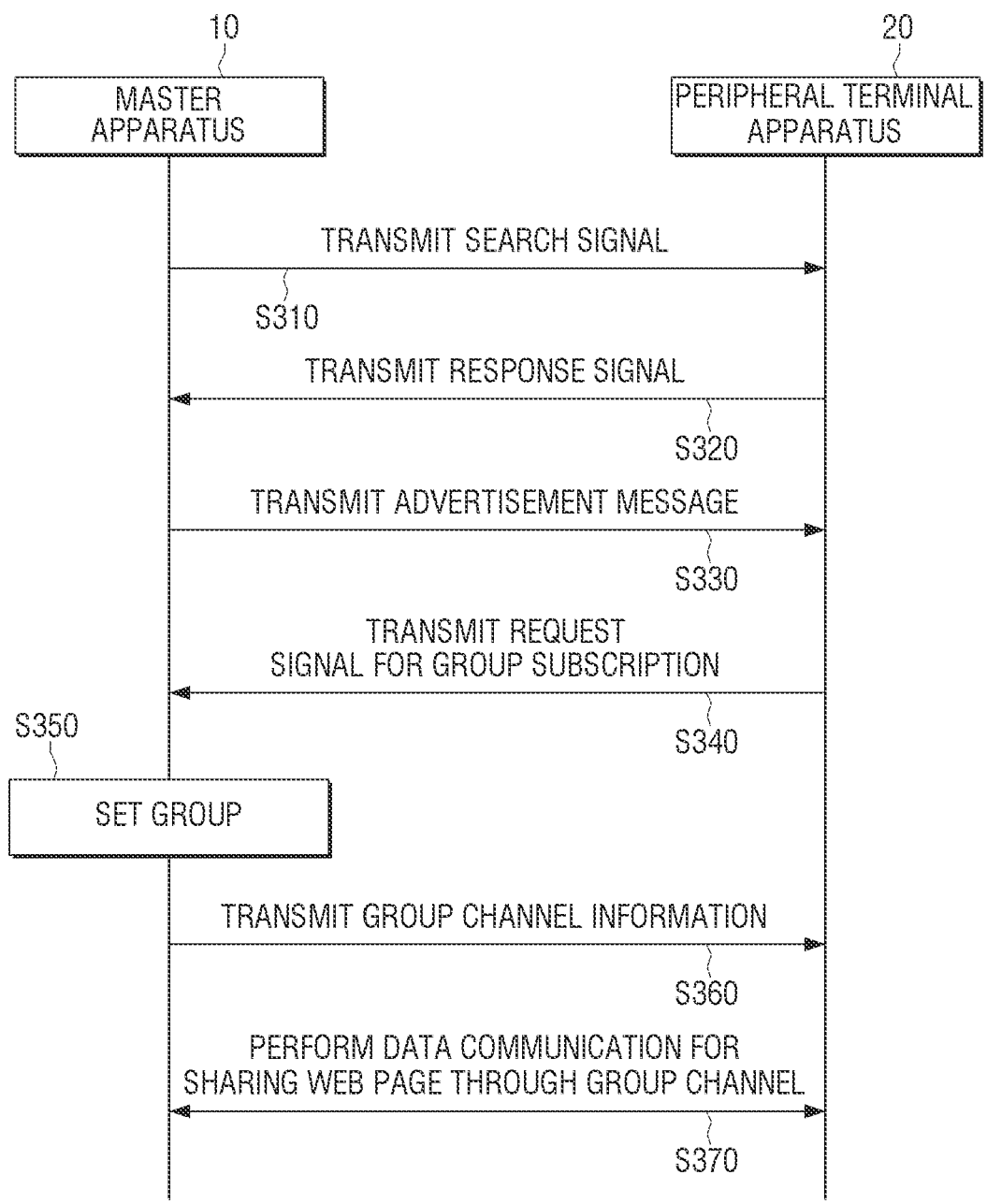
FIG. 3 is a first process view for setting a group with a peripheral terminal apparatus for sharing a web page through a preset group channel in a master apparatus of a network system according to an embodiment of the present disclosure.

FIG. 3 is a first process view for setting a group with a peripheral terminal apparatus for sharing a web page through a preset group channel in a master apparatus of a network system according an embodiment of the present disclosure.

Referring to FIG. 3, when a group channel regarding an available channel is set based on the group channel information received from the peripheral master apparatus 10', the master apparatus 10 transmits a search signal for searching a peripheral terminal apparatus that is within a preset range through the common use channel at operation S310. The search signal may include address information of the master apparatus 10, serial information and a search request message for searching a peripheral terminal apparatus.

When the search signal is received from the master apparatus 10, the peripheral terminal apparatus 20 transmits a response signal to the master apparatus 10 through the common use channel based on the address information included in the received search signal at operation S320. The response signal may include address information and device information of the peripheral terminal apparatus 20. When the response signal is received from the peripheral terminal apparatus 20, the master apparatus 10 may transmit an advertisement message to the peripheral terminal apparatus 20 that transmitted the response signal through the common use channel based on the address information included in the received response signal at operation S330. However, there is no limitation thereto, and thus when a response signal is received from a plurality of peripheral terminal apparatuses 20, the master apparatus 10 may transmit the advertisement message to a certain peripheral terminal apparatus 20 of the plurality of peripheral terminal apparatuses 20 that transmitted the response signal. The certain peripheral terminal apparatus 20 may be a terminal apparatus selected by the user or a terminal apparatus preregistered in the master apparatus 10.

Not only that, after a group channel regarding an available channel is set, the master apparatus 10 may transmit the advertisement message by transmitting through the common use channel.

The advertisement message may be guide information on the web page currently being displayed on the master apparatus 10. Therefore, when such an advertisement message is received, the peripheral terminal apparatus 20 may display the received advertisement message on a screen, and the user of the peripheral terminal apparatus 20 may determine whether or not to share the web page being displayed on the master apparatus 10 through the advertisement message displayed on the screen.

When a share command regarding the web page is input, the peripheral terminal apparatus 20 transmits group subscription request signal to the master apparatus 10 that transmitted the advertisement message through the common use channel at operation S340. Accordingly, the master apparatus 10 sets a group for sharing the web page through the preset group channel with the peripheral terminal apparatus 20 based on the group subscription request information received from the peripheral terminal apparatus 20 at operation S350. Then, the master apparatus 10 transmits the group channel information regarding the preset group channel to the peripheral terminal apparatus 20 through the common use channel at operation S360. Accordingly, the master apparatus 10 and the peripheral terminal apparatus 20 perform data communication for sharing the web page through the preset group channel in the master apparatus at operation S370.

At least one peripheral terminal apparatus may request grouping to a same group through the preset group channel to the master apparatus 10.

Figure 4:
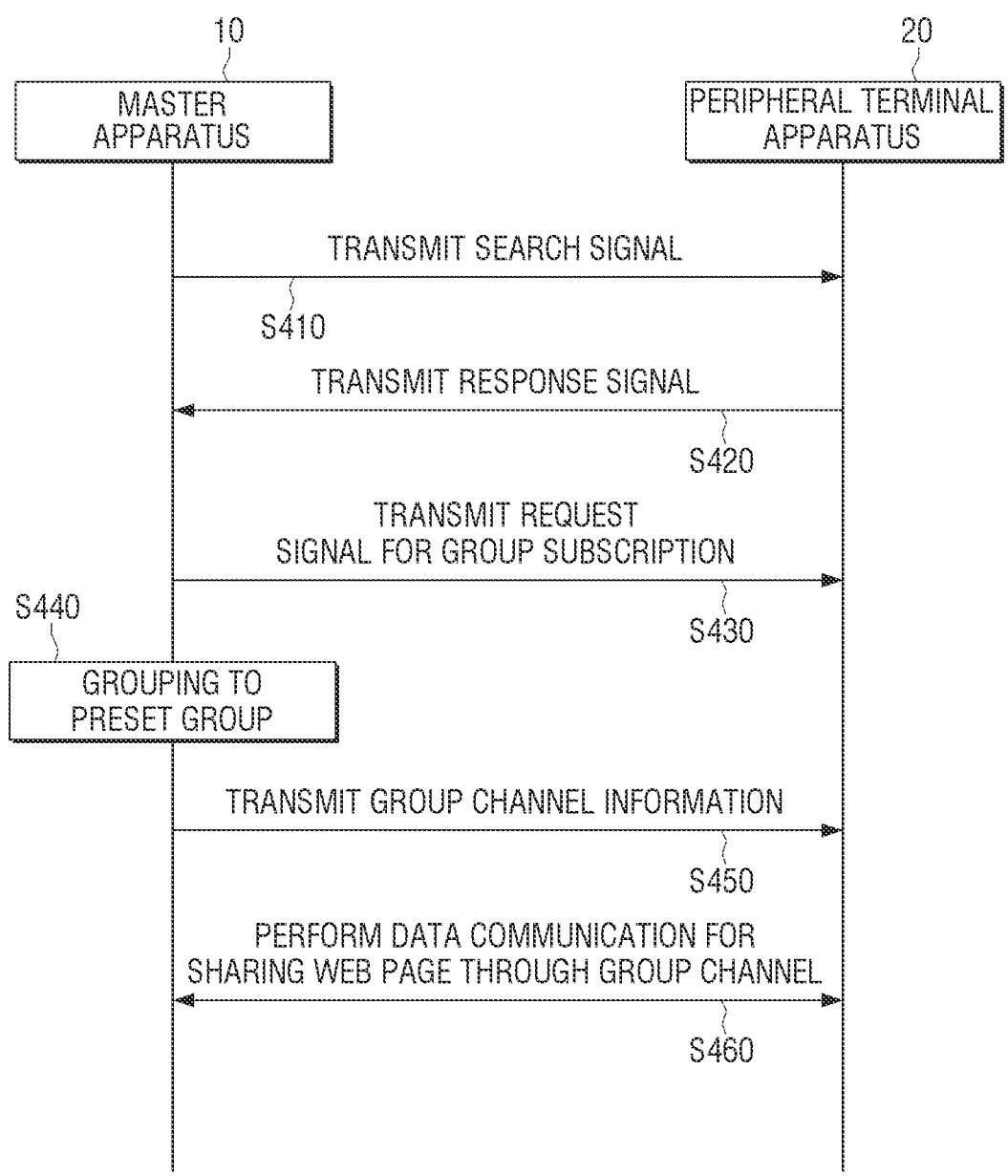
FIG. 4 is a second process view for setting a group with a master apparatus through a preset group channel in a peripheral terminal apparatus of a network system according to an embodiment of the present disclosure.

FIG. 4 is a second process view for setting a group with a master apparatus through a preset group channel in a peripheral terminal apparatus of a network system according an embodiment of the present disclosure.

Referring to FIGS. 2 and 3, the master apparatus 10 may set a group channel regarding the available channel based on the group channel information received from the peripheral master apparatus 10', and may perform data communication for sharing the web page through the preset group channel with the at least one peripheral terminal apparatus set to a same group.

Referring to FIG. 4, the user of the peripheral terminal apparatus 20 that is not grouped with the master apparatus 10 may request a search regarding at least one terminal apparatus for sharing a web page of the master apparatus 10. When such a search command is input, the peripheral terminal apparatus 20 transmits a search signal for searching all master apparatuses within a preset range by transmitting through the common use channel at operation S410. The search signal may include address information and serial information of the peripheral terminal apparatus 20, and a search request message for searching a preset terminal apparatus.

When such a search signal is received, the master apparatus 10 transmits a response signal to the peripheral terminal apparatus 20 that transmitted the search signal through the common use channel based on the search request message included in the received search signal at operation S420. The response signal may include address information and serial information of the master apparatus 10. However, there is no limitation thereto, and the response signal may further include guide information on the web page currently being displayed on the master apparatus 10. The peripheral terminal apparatus 20 that received such a response signal transmits a group subscription request signal to the master apparatus 10 that transmitted the response signal through the common use channel at a user's request at operation S430.

Accordingly, the master apparatus 10 adds the peripheral terminal apparatus 20 to the preset group based on the group subscription request information received from the peripheral terminal apparatus 20, and then, the master apparatus 10 transmits group channel information on the preset group channel to the peripheral terminal apparatus through the common use channel at operations S440 and S450. Accordingly, the master apparatus 10 and the peripheral terminal apparatus 20 perform data communication for web page sharing through the preset group channel in the master apparatus at operation S460.

Hereinafter, a master apparatus 10, and an operation of sharing a web page in a peripheral terminal apparatus 20 set to a same group as the master apparatus 10 will be explained with reference to FIG. 5.

Figure 5:
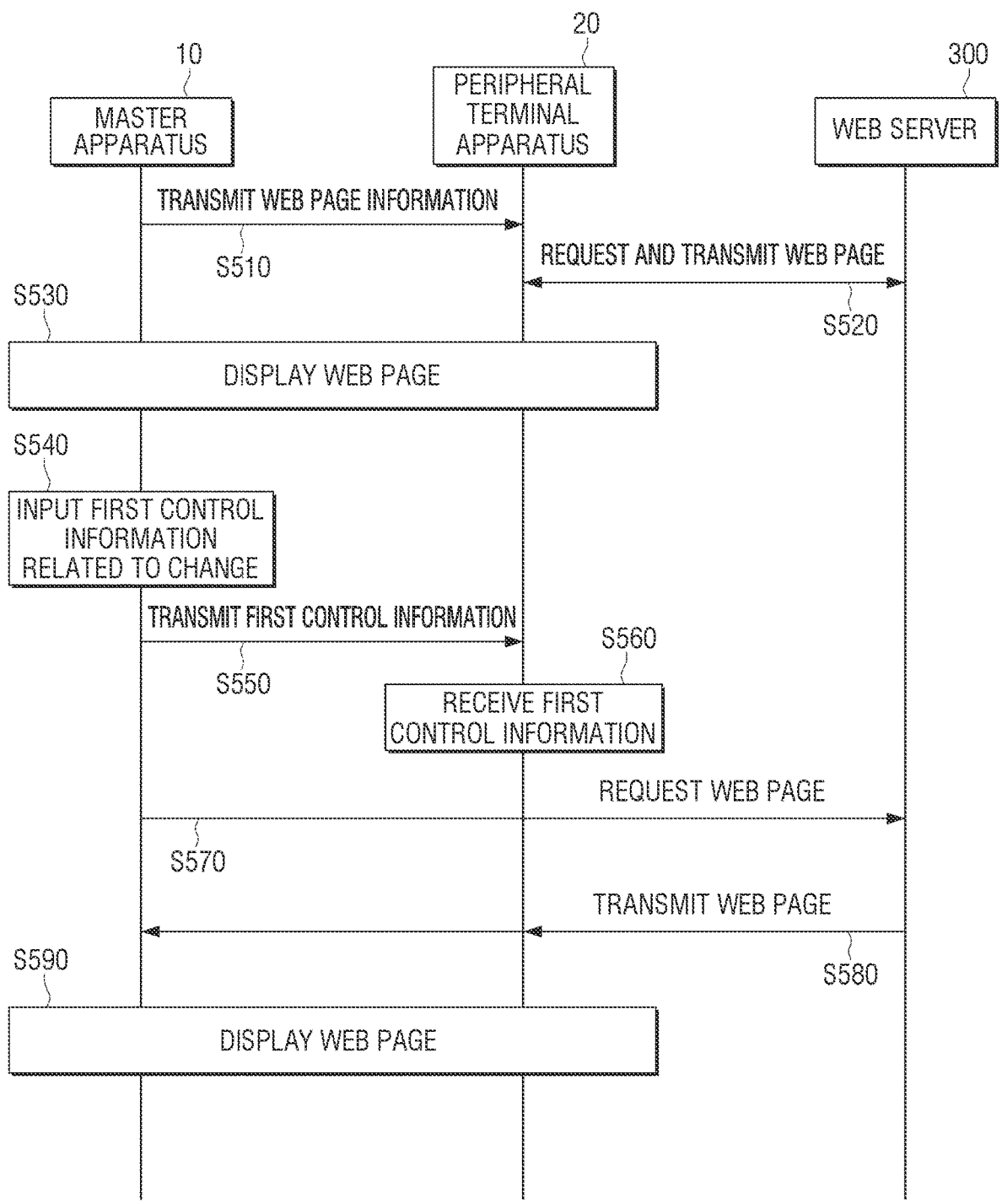
FIG. 5 is a first process view for sharing a web page between terminal apparatuses set in a same group in a network system according to an embodiment of the present disclosure.

FIG. 5 is a first process view for sharing a web page between terminal apparatuses set in a same group in a network system according an embodiment of the present disclosure.

Referring to FIG. 5, when grouping through a preset group channel with a peripheral terminal apparatus 20, the master apparatus 10 transmits web page information regarding a web page currently being displayed through a corresponding group channel at operation S510. The web page information may include Uniform Resource Locator (URL) information regarding a web page currently being displayed on the master apparatus 10. The peripheral terminal apparatus 20 that received such web page information requests the web page to a web server 300 based on the received web page information, and the web page 300 transmits the requested web page to the peripheral terminal apparatus 20 at operation S520. Accordingly, the peripheral terminal apparatus 20 may display a same web page as the web page currently being displayed on the master apparatus 10 at operation S530.

As such, with the master apparatus 10 and the peripheral terminal apparatus 20 displaying a same web page, when first control information related to changing is input from a user, the master apparatus 10 transmits the first control information related to changing that is input to the peripheral terminal apparatus 20 through a preset group channel at operations S540 and S550. The first control information related to changing is control information for changing from a web page currently being displayed to a new web page, and the first control information may include URL information regarding the new web page.

The master apparatus 10 that transmitted the first control information related to changing to the peripheral terminal apparatus 20 requests a web page change to a web server 300 based on the terminal apparatus, and the web server 300 transmits the web page requested by the master terminal apparatus 10 at operations S570 and S580. Accordingly, the master apparatus 10 changes the web page currently being displayed on the master apparatus 10 to the web page received from the web server 30 and displays the received web page at operation S590.

When the first control information is received from the master apparatus 10, as in operation S570, the peripheral terminal apparatus 20 requests a web page to the web server 300 based on URL information included in the first control information, and as at operation S580, the web server 300 transmits a web page corresponding to the URL information based on the web page request received from the peripheral terminal apparatus 20. Accordingly, as in at operation S590, the peripheral terminal apparatus 20 may change the web page currently being displayed to the web page received from the web server 300 and display the web page received.

As previously mentioned, when a first control command related to changing is input, the master terminal apparatus 10 transmits the first control information related to changing that is input through a preset group channel, and requests the web page to the web server 300, and thus the master apparatus 10 and the peripheral terminal apparatus 20 may request a same web page to the web server 300 at and display the web page almost a same time zone.

With the master apparatus 10 and the peripheral terminal apparatus 20 displaying a same web page, when an input of first control information related to changing is sensed as in at operation S540, before transmitting the first control information related to changing to the peripheral terminal apparatus 20, the master apparatus 10 may transmit a forenotice signal for forenoticing a web page change to the peripheral terminal apparatus 20 through a preset group channel.

Accordingly, the peripheral terminal apparatus 20 displays a notice message noticing change of web page based on the forenotice signal received from the master apparatus 10 on a screen. Then, as in operations S560 and S570, when the first control information is received from the master apparatus 10, the peripheral terminal apparatus 20 may request a same web page as the web page requested by the master apparatus 10 and display the web page requested.

As such, while displaying a same web page as the master apparatus 10, the peripheral terminal apparatus 20 according to an embodiment of the present disclosure displays a notice message based on the forenotice signal according to the first control information related to changing received from the master apparatus 10. Therefore, a user of the peripheral terminal apparatus 20 may anticipate that a web page currently being displayed will be changed to a new web page and appropriately act accordingly.

Hereinafter, a master apparatus that displays a same web page and an operation of changing to a new web page according to a web page change in a peripheral terminal apparatus will be explained in detail with reference to FIGS. 6 to 8.

Figure 6:
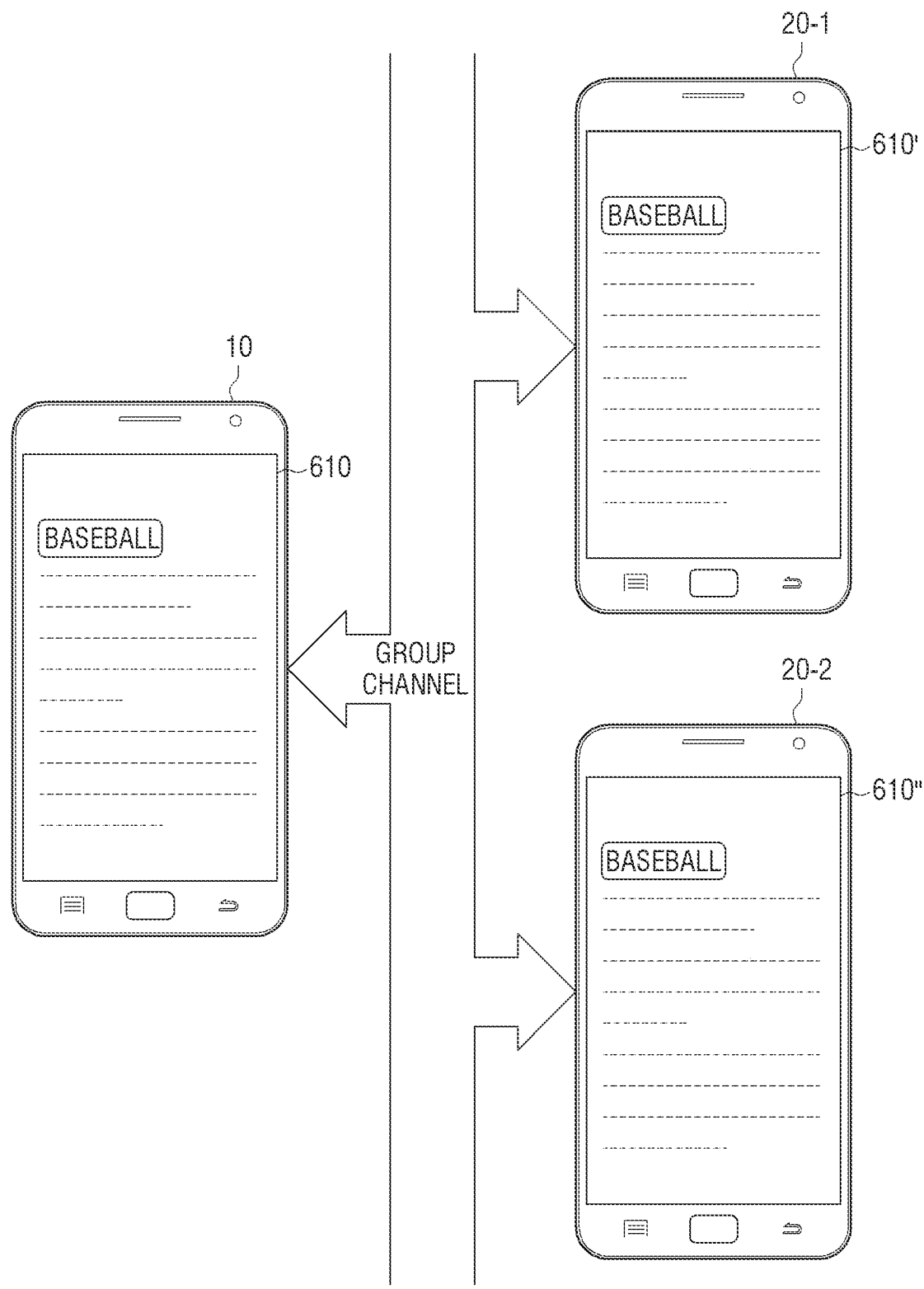
FIG. 6 is a view displaying a same web page in a master apparatus and a peripheral terminal apparatus according to an embodiment of the present disclosure.

FIG. 6 is a view displaying a same web page in a master apparatus and a peripheral terminal apparatus according an embodiment of the present disclosure.

Figure 7:
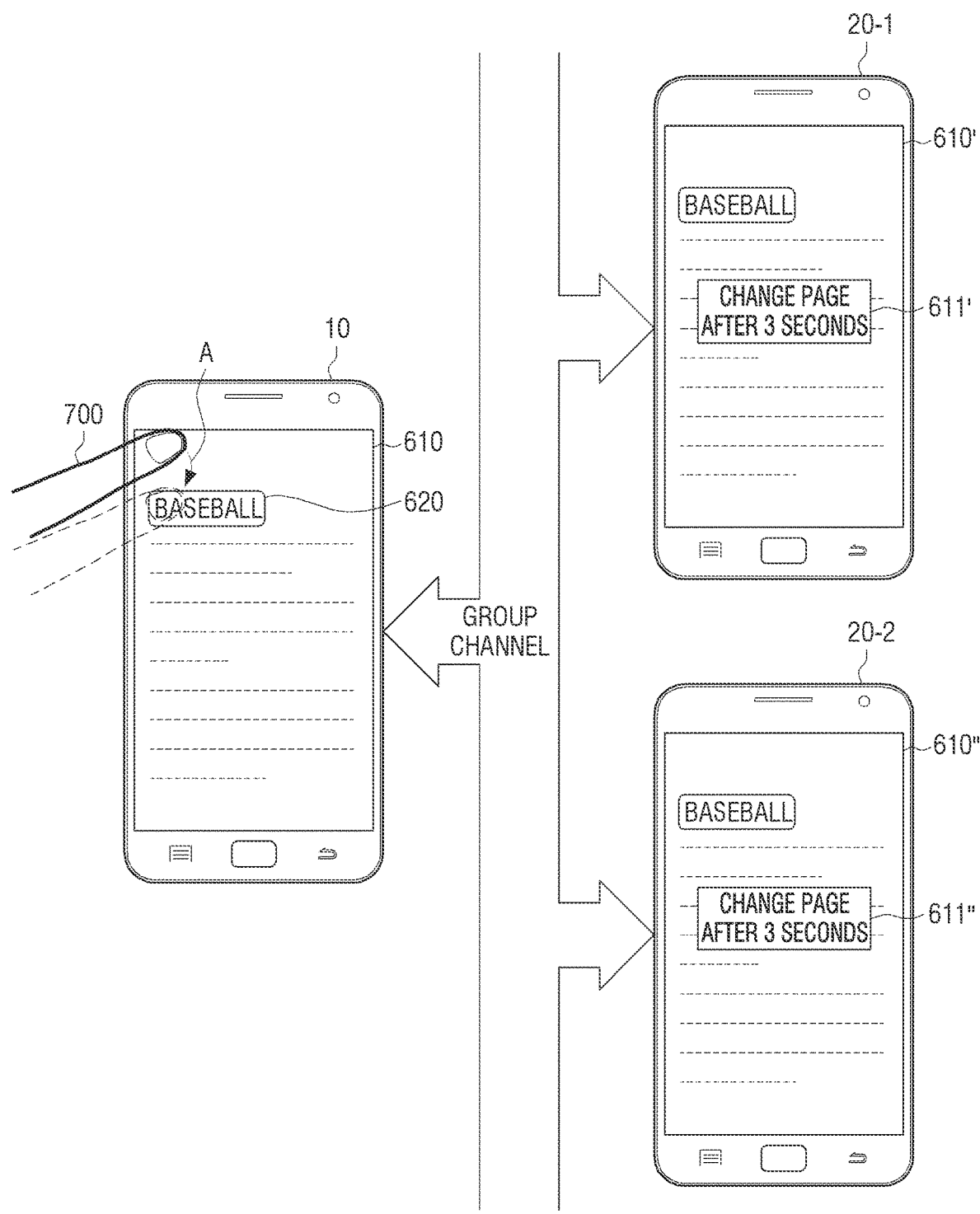
FIG. 7 is a view illustrating occurrence of an event related to web page change in a master apparatus and a peripheral terminal apparatus according to an embodiment of the present disclosure.

FIG. 7 is a view illustrating occurrence of an event related to web page change in a master apparatus and a peripheral terminal apparatus according an embodiment of the present disclosure.

Figure 8:
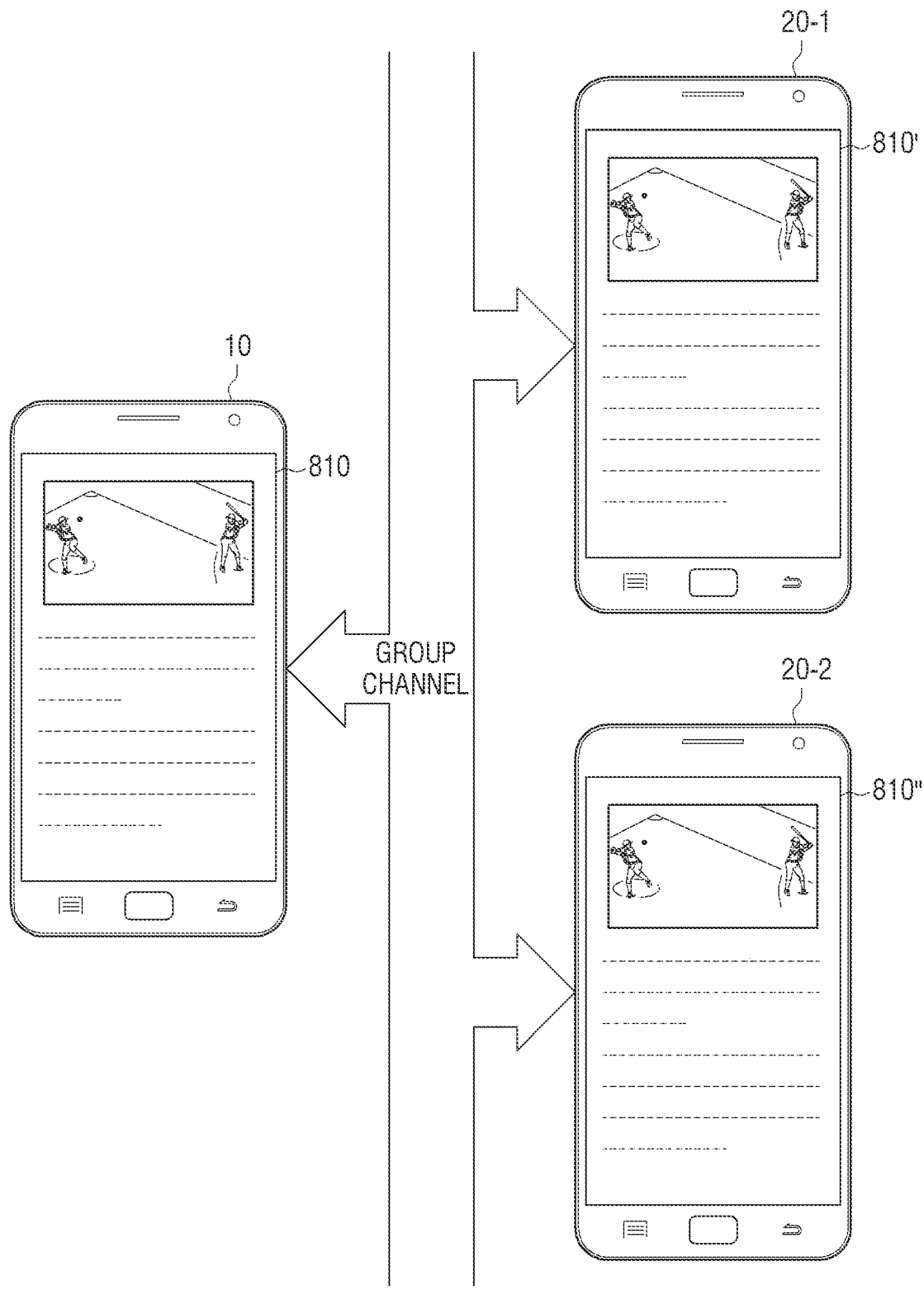
FIG. 8 is a view illustrating a same web page changed in a master apparatus and a peripheral terminal apparatus according to an embodiment of the present disclosure.

FIG. 8 is a view illustrating a same web page changed in a master apparatus and a peripheral terminal apparatus according an embodiment of the present disclosure.

Referring to FIG. 6, a master apparatus 10 that displays a sports web page 610 provided from a web server 300 may be grouped with a first peripheral terminal apparatus 20-1 and a second peripheral terminal apparatus 20-2 through a preset group channel. As such, when grouping with the first and second peripheral terminal apparatuses 20-1, 20-2, the master apparatus 10 transmits web page information regarding a web page currently being displayed to the first and second peripheral terminal apparatuses 20-1, 20-2 through the preset group channel. Accordingly, the first and second peripheral terminal apparatuses 20-1, 20-2 request a sports web page to the web server 300 based on URL information included in the web page information received from the master apparatus 10 and receive the sports web page requested. Accordingly, the first and second peripheral terminal apparatuses 20-1, 20-2 set to a same group as the master apparatus 10 may display a same sports web page 610', 610" as the sports web page currently being displayed on the master apparatus 10.

Referring to FIG. 7, the master apparatus 10 and the first and second peripheral terminal apparatuses 20-1, 20-2 displaying the same sports web page 610, 610', 610", the user may move his/her finger 700 to where an icon related to baseball 620 is located to select the icon related to baseball 620 displayed on the sports web page 610. As such, when the user's finger 700 moves to where the icon related to baseball 620 is located and the user's finger 700 and the icon related to baseball 620 are located in a preset critical distance A for a preset critical time, the master apparatus 10 determines that the icon related to baseball 620 is selected and a forenotice command for changing to a web page related to the icon is input.

When it is determined that such an event related to web page change occurred, the master apparatus 10 creates a forenotice signal noticing a web page change and transmits the forenotice signal to the first and second peripheral terminal apparatuses 20-1, 20-2. Then, when an icon related to baseball is selected 620, the master apparatus 10 determines that first control information for changing to a web page related to the selected icon is input. Accordingly, the master apparatus 10 transmits the first control information related to web page change that is input to the first and second peripheral terminal apparatuses 20-1, 20-2 through a preset group channel.

When the forenotice signal is received from the master apparatus 10, the first and second peripheral terminal apparatuses 20-1, 20-2 creates a notice message 611', 611" noticing a web page change such as "page change after 3 seconds" and displays the notice message.

After transmitting the first control information that is preinput to the first and second peripheral terminal apparatuses 20-1, 20-2, the master apparatus 10 requests a web page corresponding to the first control information to the web server 300. Furthermore, the first and second peripheral terminal apparatuses 20-1, 20-2 requests a web page to the web server 300 based on URL information included in the first control information received from the master apparatus 10.

Referring to FIG. 8, the master apparatus 10 and the first and second peripheral terminal apparatuses 20-1, 20-2 changes a same web page related to sports 610, 610', 610" to a same web page related to baseball 810, 810', 810" and displays the same web page related to baseball 810, 810', 810".

When the first control information is input, after transmitting the first control information to the first and second peripheral terminal apparatuses 20-1, 20-2, the master apparatus 10 requests a web page according to the first control information to the web server 300, thereby synchronizing the timing of requesting a web page to the web server 300 from the master apparatus 10 and the first and second peripheral terminal apparatuses 20-1, 20-2.

Figure 9:
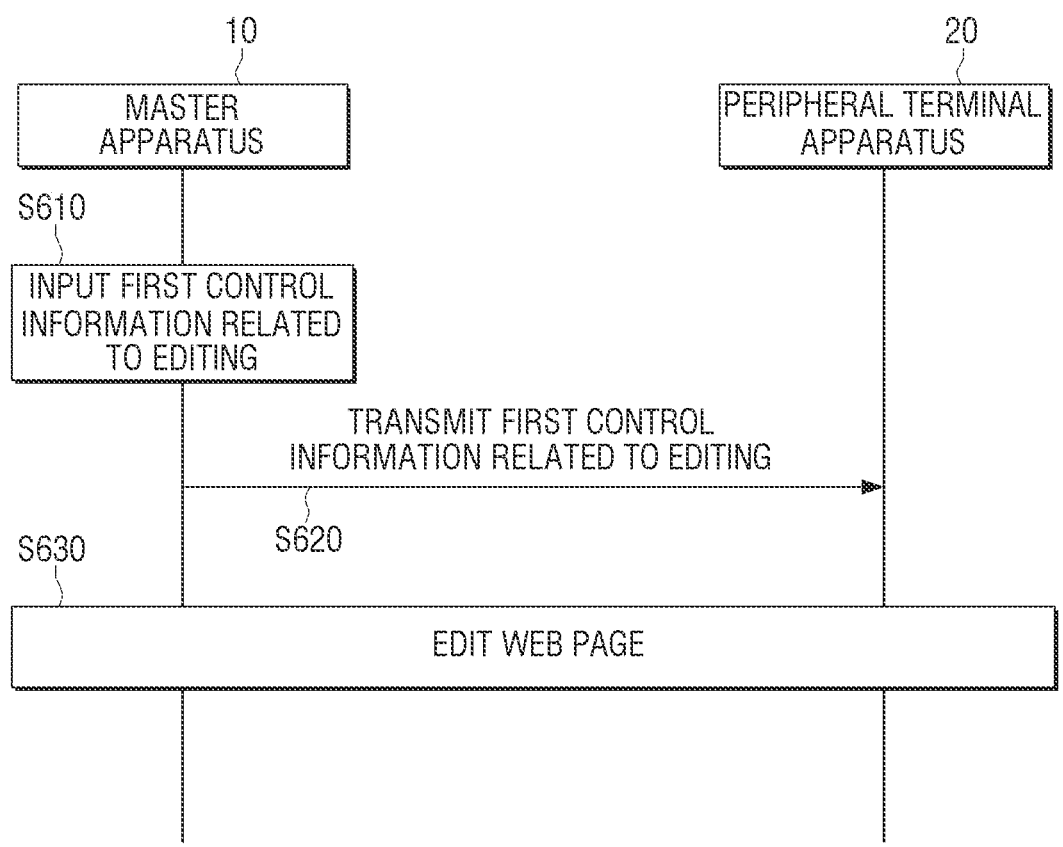
FIG. 9 is a second process view for sharing a web page between terminal apparatuses set in a same group in a network system according to an embodiment of the present disclosure.

FIG. 9 is a second process view for sharing a web page between terminal apparatuses set in a same group in a network system according an embodiment of the present disclosure.

Referring to FIG. 9, when a group is set with the peripheral terminal apparatus 20 through a preset group channel, the master apparatus 10 transmits web page information regarding a web page currently being displayed through the corresponding group channel. The web page information may include URL information regarding the web page currently being displayed on the master apparatus 10. The peripheral terminal apparatus 20 that received such web page information requests a web page to the web server 300 based on the web page information received, and transmits the requested web page to the peripheral terminal apparatus 20. Accordingly, the peripheral terminal apparatus may display the same web page as the web page currently being displayed on the master apparatus 10.

As such, with the master apparatus 10 and the peripheral terminal apparatus 20 displaying the same web page, the master apparatus receives input of first control information related to editing regarding the web page currently being displayed from the user at operation S610. The first control information related to editing may include a web page scroll control manipulation, text input manipulation, drag manipulation, and user's focusing related manipulation and so forth. When such first control information related to editing is input, the master apparatus 10 transmits the first control information related to editing that is input to the peripheral terminal apparatus 20 through the group channel at operation S620. Then, the master apparatus 10 and the peripheral terminal apparatus 20 perform editing regarding the same web page displayed on the screen based on the first control information related to editing at operation S630.

As such, when the first control information related to editing regarding the web page is input, the master apparatus 10 transmits the first control information input to the peripheral terminal apparatus 20, and performs editing regarding the web page based on the first control information input. Therefore, the timing of editing the web page displayed on the screen of the master apparatus 10 and the peripheral terminal apparatus 20 may be synchronized.

Figure 10:
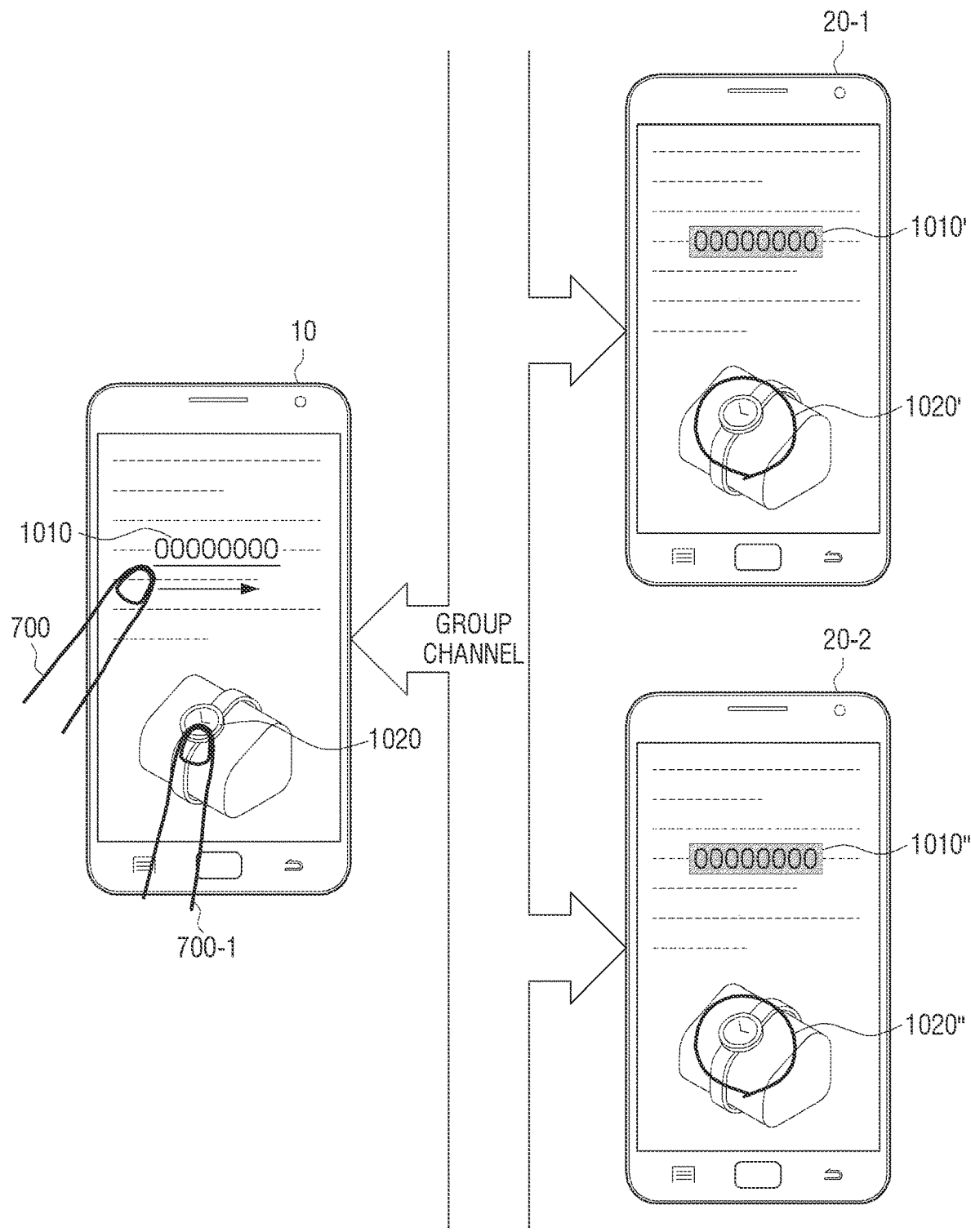
FIG. 10 is a view displaying a web page edited in a master apparatus and a peripheral terminal apparatus according to an embodiment of the present disclosure.

FIG. 10 is a view displaying a web page edited in a master apparatus and a peripheral terminal apparatus according an embodiment of the present disclosure.

Referring to FIG. 10, when a group is set with first and second peripheral terminal apparatuses 20-1, 20-2 through a preset group channel, a master apparatus 10 transmits web page information regarding a web page currently being displayed through the group channel. The web page information may include URL information regarding the web page currently being displayed on the master apparatus 10. The first and second peripheral terminal apparatuses 20-1, 20-2 that received such web page information requests a web page to a web server 300 based on the received web page information, and the web server 300 transmits the requested web page to a peripheral terminal apparatus 20. Accordingly, the first and second peripheral terminal apparatuses 20-1, 20-2 may display a same web page as the web page currently being displayed on the master apparatus 10.

As such, with the master apparatus 10 and the first and second peripheral terminal apparatuses 20-1, 20-2 displaying a same web page, the first and second peripheral terminal apparatuses 20-1, 20-2 may performing editing of the web page based on first control information received from the master apparatus 10.

A user may use his/her finger 700 to drag a certain context message 1010 displayed on a web page from left to right. When such a touch event related to drag occurs, the master apparatus 10 determines that first control information related to editing is input, creates first control information related to editing including a coordinate value of an initially touched touch area and a coordinate value of a finally touched touch area, and transmits the created first control information related to editing to the first and second peripheral terminal apparatuses 20-1, 20-2 through a preset group channel. Then, according to the first control information input by the user, the master apparatus 10 may perform an editing operation of displaying an underline underneath the context message 1010 based on a coordinate value corresponding to a touch direction that is dragged from left to right by the user's finger 700.

The first and second peripheral terminal apparatuses 20-1, 20-2 that received the first control information from the master apparatus 10 may perform an editing operation of displaying a highlight on a same context message 1010', 1010" as the context message 1010 having the underline on the screen of the master apparatus 10 based on the coordinate value included in the first control information received. Therefore, the timing of editing a same web page displayed on the master apparatus 10 and the first and second peripheral terminal apparatuses 20-1, 20-2 may be synchronized. Not only that, by editing an area corresponding to an area that the user of the master apparatus 10 instructed, the user of the first and second peripheral terminal apparatuses 20-1, 20-2 may check the part that the user of the master apparatus 10 instructed more easily and quickly As illustrated in FIG. 10, the user may use his/her finger 700-1 to touch an image 1020 displayed on a web page for a preset critical time. When such a touch event occurs, the master apparatus 10 determines that first control information related to editing is input, creates first control information including a coordinate value touched by the user's finger 700-1, and transmits the created first control information to the first and second peripheral terminal apparatuses 20-1, 20-2 through a preset group channel. Accordingly, based on the coordinate value included in the first control information received, the first and second peripheral terminal apparatuses 20-1, 20-2 may perform an editing operation of performing a selection display regarding a same image as an image of a web page displayed on a screen of the master apparatus 10. As such, by editing an area corresponding to an area instructed by the user of the master apparatus 10, the first and second peripheral terminal apparatuses 20-1, 20-2 may check the part instructed by the user of the master apparatus 10 more easily and quickly.

As previously mentioned, the master apparatus 10 that transmits first control information for performing editing or changing regarding a web page to the peripheral terminal apparatus 20 that is grouped through a group channel and displays a same web page may be an apparatus granted with a control authority. That is, when the master apparatus 10 is granted with a control authority, it is desirable that the master apparatus 10 and the peripheral terminal apparatus 20 grouped through the group channel do not perform an operation according to a web page change or control command related to editing from the user.

Hereinafter, a master apparatus 10, and an operation of granting a control authority to one of the master apparatus 10 and peripheral terminal apparatuses 20 grouping to a same group through a group channel will be explained.

Figure 11:
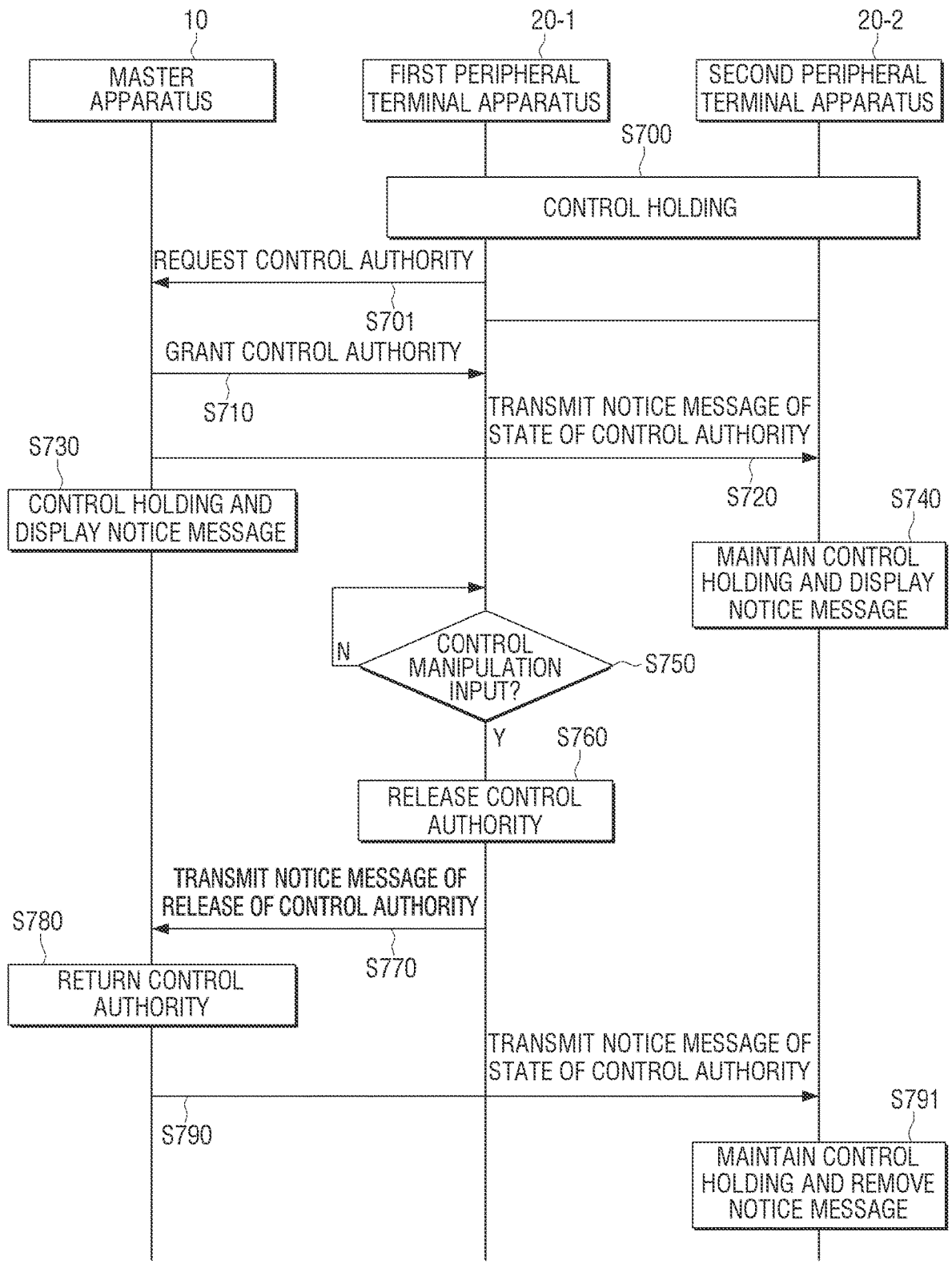
FIG. 11 is a first process view for granting a control authority to a master apparatus and a peripheral terminal apparatus grouped to a same group according to an embodiment of the present disclosure.

FIG. 11 is a first process view for granting a control authority to a master apparatus and a peripheral terminal apparatus grouped to a same group according an embodiment of the present disclosure.

As previously mentioned, a master apparatus 10, and a first and second terminal apparatus 20-1, 20-2 may be set in a same group and display a same web page. In response to the master apparatus 10 being set to a same group as the first and second peripheral terminal apparatus 20-1, 20-2 through a preset group channel, the master apparatus 10 may be initially granted with a control authority for changing or editing a web page or grant a control authority at a request by the first or second peripheral terminal apparatus 20-1, 20-2.

Referring to FIG. 11, in response to a control authority granted to a current master apparatus 10, the first and second peripheral terminal apparatus 20-1, 20-2 performs control holding so as not to perform an operation corresponding to a manipulation command regarding changing or editing a web page at operation S700. As such, with a control authority granted to the master apparatus 10, of the first and second peripheral terminal apparatuses 20-1, 20-2, the first peripheral terminal apparatus 20-1 transmits a request message for control authority for changing or editing a web page to the master apparatus 10 at a user's request at operation S701. That is, at operation S701, the master apparatus 10 is at a state where it is possible to change or edit a web page based on the control manipulation command input from the user, and the first and second peripheral terminal apparatuses 20-1, 20-2 are at a state where it is impossible to change or edit a web page based on the control manipulation command input from the user. However, the first and second peripheral terminal apparatuses 20-1, 20-2 may receive an input of a user command for a control authority request, and based on such a user command, the first and second peripheral terminal apparatuses 20-1, 20-2 may request a control authority to the master apparatus 10.

Therefore, in response to receiving a request message for control authority from the first peripheral terminal apparatus 20-1, the master apparatus 10 determines whether or not it is possible to grant a control authority to the first peripheral terminal apparatus 20-1, and if so, transmits a notice message noticing that a control authority is granted to the first peripheral terminal apparatus 20-1 at operation S710. Then, the master apparatus 10 transmits a notice message of state of control authority that notices that the control authority is granted to the first peripheral terminal apparatus 20-1 to the first peripheral terminal apparatus 20-1 at operation S720. Then, the master apparatus 10 performs control holding so as not to perform an operation corresponding to a manipulation command related to changing or editing a web page and displays a notice message noticing that a control authority is granted to the first peripheral terminal apparatus 20-1 on a screen at operation S730. The second peripheral terminal apparatus 20-2 that received the notice message of state of control authority displays a notice message that notices that a control authority is granted to the first peripheral terminal apparatus 20-1 on a screen while maintaining the control holding operation for not to perform an operation corresponding to a manipulation command related to changing or editing a web page at operation S740. Accordingly, the user of the master apparatus 10 and second peripheral terminal apparatus 20-2 may check that the control manipulation related to changing or editing a web page is currently being held.

The first peripheral terminal apparatus 20-1 that is granted with the control authority from the master apparatus 10 determines whether or not a control manipulation command related to changing or editing a web page is input within a preset critical time at operation S750. If it is determined that a control manipulation command related to changing or editing a web page is input within a preset critical time, the first terminal apparatus 20-1 maintains the control authority regarding the web page. If it is determined that a control manipulation command related to changing or editing a web page is not input within a preset critical time, the first peripheral terminal apparatus 20-1 releases the control authority regarding the web page and transmits a notice message of release of control authority according thereto at operations S760 and S770.

In response to receiving a notice message of release of control authority from the first peripheral terminal apparatus 20-1 granted with the control authority, the master apparatus 10 returns to an initial state having a control authority regarding a web page at operation S780. It is desirable that the master apparatus 10 removes the notice message displayed on the screen at operation S730 from the screen. Then, the master apparatus 10 transmits the notice message of state of control authority showing that the control authority of the first peripheral terminal apparatus 20-1 is released to the second peripheral terminal apparatus 20-2 at operation S790. Accordingly, the second peripheral terminal apparatus 20-2 removes the notice message related to control authority displayed on the screen from the screen while maintaining an operation of control holding for not to perform an operation corresponding to a manipulation command related to changing or editing a web page at operation S791. Accordingly, the user of the second peripheral terminal apparatus 20-2 may determine whether or not it is possible to make a control authority request.

Figure 12:
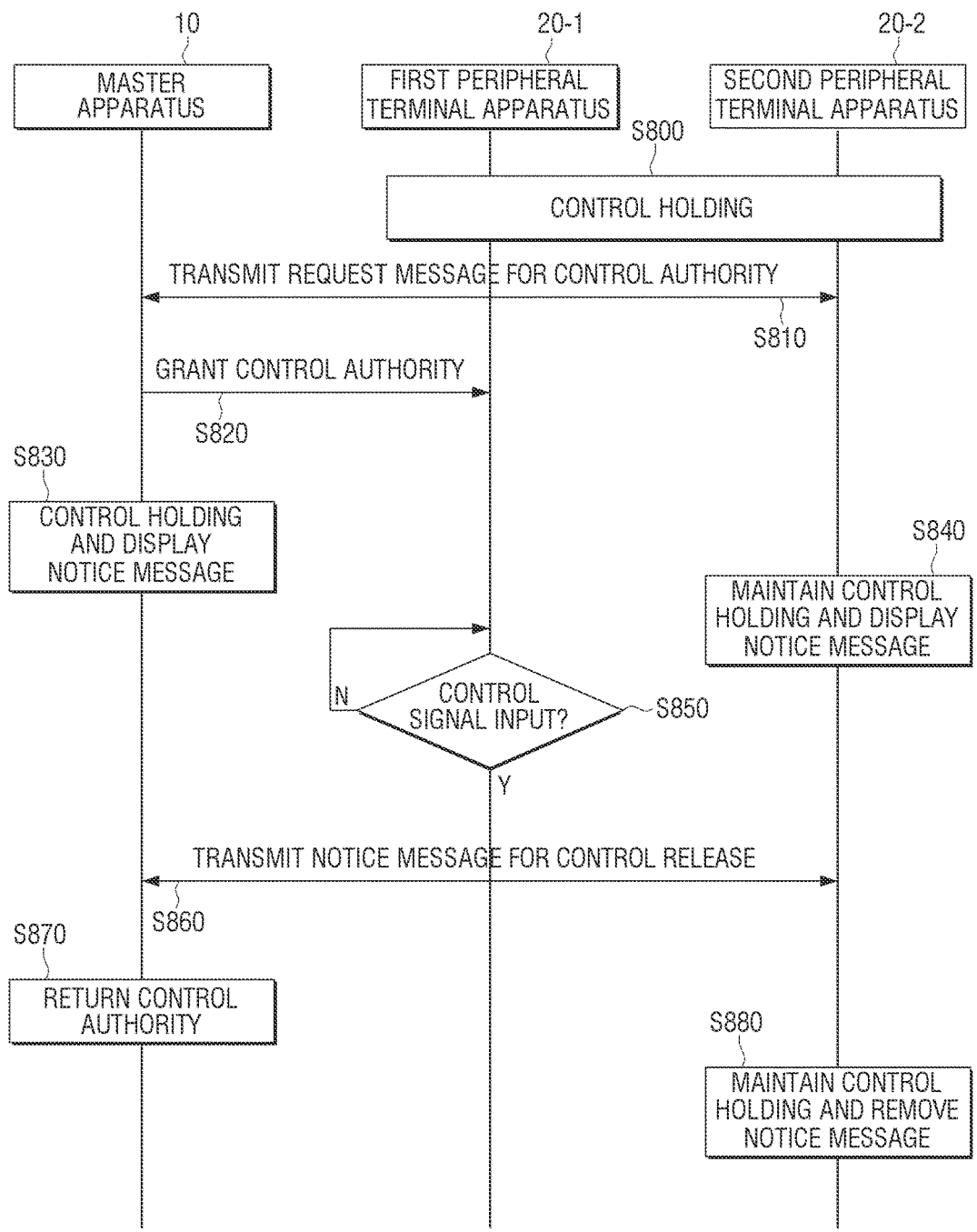
FIG. 12 is a second process view for granting a control authority to a master apparatus and a peripheral terminal apparatus grouped to a same group according to another embodiment of the present disclosure.

FIG. 12 is a second process view for granting a control authority to a master apparatus and a peripheral terminal apparatus grouped to a same group according to another embodiment of the present disclosure.

Referring to FIG. 12, in response to a control authority being granted to a master apparatus 10, a first and second peripheral terminal apparatus 20-1, 20-2 perform a control holding so as not to perform an operation corresponding to a manipulation command regarding changing or editing a web page at operation S800. As such, with the control authority granted to the master apparatus 10, at the user's request, the first peripheral terminal apparatus 20-1 transmits a request message for control authority for changing or editing a web page by transmitting through a group channel at operation S810.

Of the master apparatus 10 and second peripheral terminal apparatus 20-2 that received the request message for control authority, the master apparatus 10 granted with the control authority transmits a notice message noticing that the control authority is granted to the first peripheral terminal apparatus 20-1 that transmitted the request message for control authority based on the request message for control authority received at operation S820. Then, the master apparatus 10 performs control holding so as not to perform an operation corresponding to a manipulation command related to changing or editing a web page and displays a notice message noticing that a control authority is granted to the first peripheral terminal apparatus 20-1 on a screen at operation S830. The second peripheral terminal apparatus 20-2 that received a request message for control authority from the first peripheral terminal apparatus 20-1 displays a notice message noticing that a control authority is granted to the first peripheral terminal apparatus 20-1 on a screen while maintaining an operation of control holding for not to perform an operation corresponding to a manipulation command related to changing or editing a web page at operation S840. Accordingly, the user of the master apparatus 10 and the second peripheral terminal apparatus 20-2 may check that the control manipulation related to changing or editing a web page is currently being held.

The first peripheral terminal apparatus 20-1 granted with a control authority from the master apparatus 10 determines whether or not a control manipulation command related to changing or editing a web page is input within a preset critical time at operation S850. As a result of determination, when a control manipulation command related to changing or editing a web page is input within a preset critical time, the first peripheral terminal apparatus 20-1 maintains the control authority regarding the web page. As a result of determination, when a control manipulation command related to changing or editing of a web page is not input within a preset critical time, the first peripheral terminal apparatus 20-1 releases the control authority regarding the web page, and transmits a notice message of release of control authority according thereto by transmitting through a group channel at operation S860.

Accordingly, the master apparatus 10 returns to an initial state having a control authority regarding a web page based on the notice message of release of control authority received from the first peripheral terminal apparatus 20-1 at operation S870. It is desirable that the master apparatus 10 removes the notice message of control authority displayed on the screen. The second peripheral terminal apparatus 20-2 removes the notice message related to control authority displayed on the screen while maintaining the control holding operation for not to operate an operation corresponding to the manipulation control related to changing or editing a web page based on the notice message of release of control authority received from the first peripheral terminal apparatus 20-1 at operation S880. Accordingly, the user of the second peripheral terminal apparatus 20-2 may determine whether or not a control authority request is possible. Above was detailed explanation on a master apparatus 10 in a network system according to the present disclosure, and an operation for displaying, changing or editing a same web page in a peripheral terminal apparatus 20 grouping through a preset group channel in the master apparatus 10. Hereinafter, a terminal apparatus 100 according to an embodiment of the present disclosure will be explained in detail. The terminal apparatus 100 is a terminal apparatus that may perform all operations of the previously mentioned master apparatus 10 or peripheral terminal apparatus 20. Hereinafter, the master apparatus 10 and peripheral terminal apparatus 20 will be referred to as the terminal apparatus 100.

Figure 13:
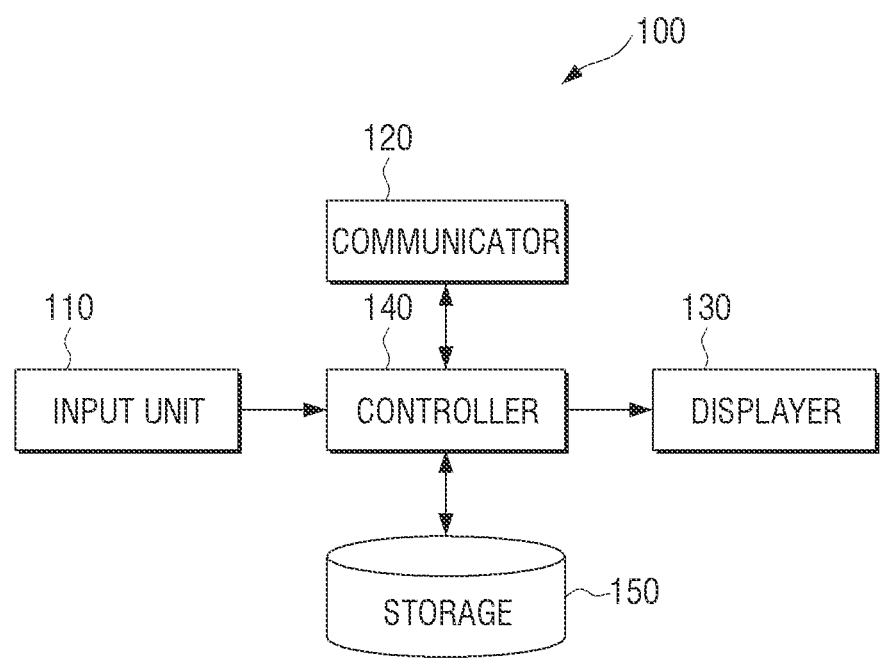
FIG. 13 is a block diagram of a terminal apparatus according to an embodiment of the present disclosure.

FIG. 13 is a block diagram of a terminal apparatus according an embodiment of the present disclosure.

Figure 14:
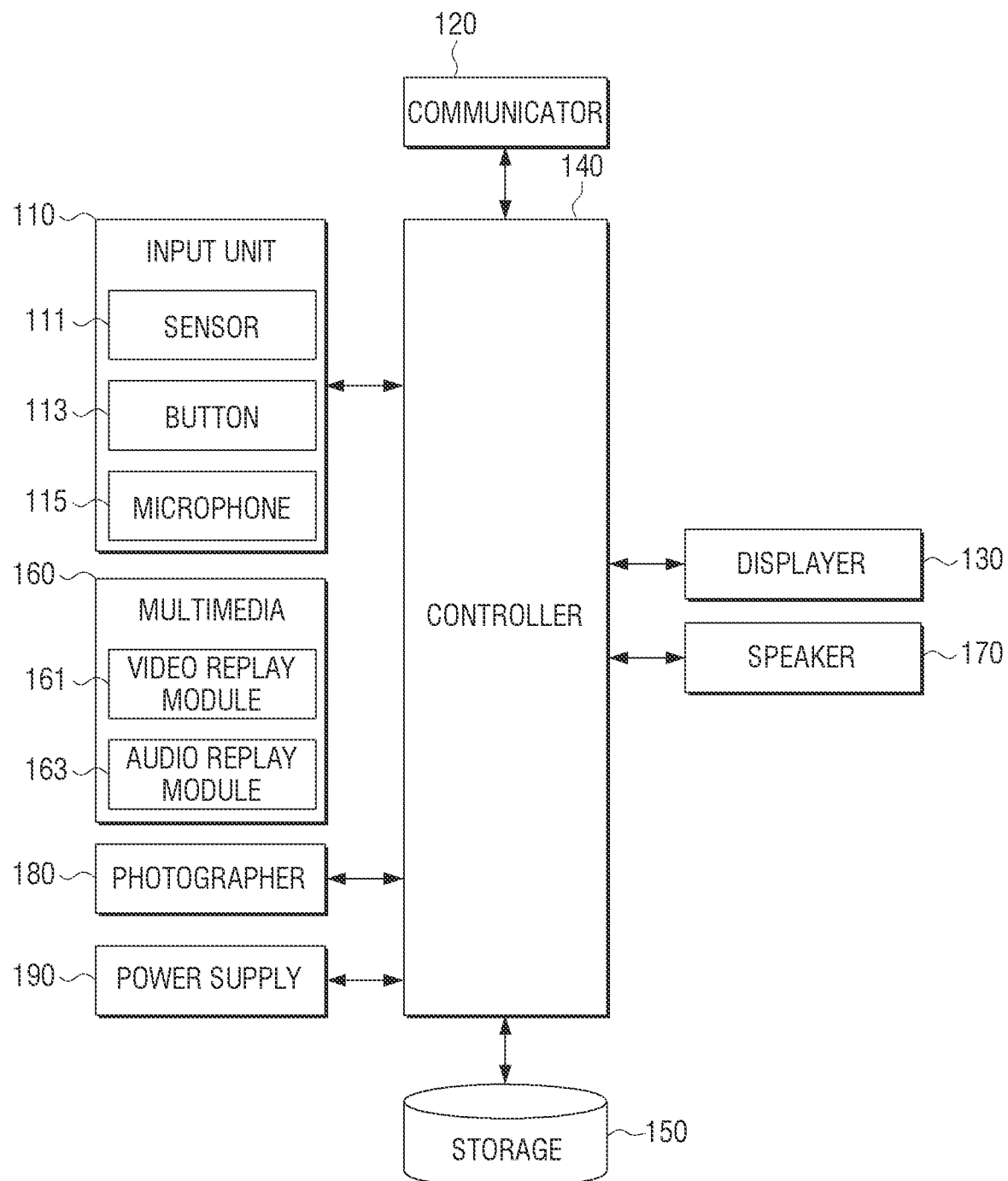
FIG. 14 is a detailed block diagram of a terminal apparatus according to an embodiment of the present disclosure.

FIG. 14 is a detailed block diagram of a terminal apparatus according an embodiment of the present disclosure.

Referring to FIGS. 13 and 14, the terminal apparatus 100 is a terminal apparatus such as a smart phone, tablet Personal Computer (PC), and smart Television (TV), and includes an input unit 110, a communicator 120, a displayer 130, a controller 140, and a storage 150.

The input unit 110 is an input means for receiving a control manipulation command from various users and transmitting the control manipulation command to the controller 140. Such an input unit 110 may include a sensor 111, a button 113, and a microphone 115, and through such a configuration, it is possible to receive a user command corresponding to a button manipulation provided in the terminal apparatus 10, sense a user motion or manipulation, or receive an audio signal being output from outside. Especially, when there is a touch input regarding a web page through a displayer 130, the sensor 111 may sense the location (coordinate) of the user's touch input and the type of input and transmit the result to the controller 140. Such a sensor 111 maybe embodied in at least one of a touch sensor, approach sensor, magnetic sensor, and acceleration sensor.

When the sensor 111 is a touch sensor, it is a sensor that is capable of sensing a contact of an input apparatus (not illustrated) of a touch such as a user's finger or touch pen regarding the displayer 130 of the terminal apparatus 100. That is, the sensor 111 is a sensor that is capable of sensing an input of selecting an object displayed on the display screen by a body part such as a finger or an inputting apparatus (not illustrated). These type of sensors 111 may be classified into electrostatic type and piezoelectric type sensors. A touch sensor according to an embodiment of the present disclosure may be embodied in any of the two types.

The sensor 111 which is a touch sensor may be included in the displayer 130 together with a display panel.

When the sensor 111 is an electrostatic sensor, it may detect the flow of a magnetic field and search the magnetic declination. More specifically, the sensor 111 that is an electrostatic sensor may detect a declination coordinate of the terminal apparatus 100, and detect the direction where the terminal apparatus 100 is located based on the pre-detected declination coordinate, and transmit the result to the controller 130. Accordingly, the controller 130 may perform an operation corresponding to a detection signal regarding the direction where the terminal apparatus 100 is located.

When the sensor 111 is an acceleration sensor that detects an acceleration of the terminal apparatus 100, the sensor 111 sets a virtual x, y, z axes on the terminal apparatus 100, and detects the acceleration of gravity that changes according to the inclination degree of each axis, and transmits the detected acceleration of gravity to the controller 140. Accordingly, the controller 140 may perform a control operation based on the acceleration of gravity detected through the sensor 111.

Besides, the sensor 111 may further include at least one of a gravity sensor that is capable of detecting to which direction the gravity is acting on, a gyro sensor that is capable of recognizing a total of 6 axes by applying rotation to an acceleration sensor, an orientation sensor that is capable of automatically sensing a width and length frame of a contents such as an image and automatically rotating or aligning the contents, an illumination sensor that is capable of detecting the amount of light surrounding the terminal apparatus 100, an altitude measurement sensor that is capable of measuring a pressure of atmosphere, an RGB sensor that is capable of detecting a color of an object, a distance measurement sensor that is capable of measuring a distance using ultrasound or infrared rays, and a hall sensor that uses changes in voltage according to intensity of magnetic field.

The communicator 120 performs communication with at least one peripheral terminal apparatus 20 and a web server 300 that provides a web page. Such a communicator 120 may transceive data with the at least one peripheral terminal apparatus 20 and web server 300 using various wired/wireless communication methods. The peripheral terminal apparatus 20 may be a smart phone, table PC, and smart TV and so forth, just as the terminal apparatus 100, and such a peripheral terminal apparatus 20 and web server 300 may be connected to the terminal apparatus 100 through a network.

Such a communicator 120 may perform communication with at least one peripheral terminal apparatus 20 and web server 300 through a wireless communication module such as a cellular communication module, wireless Local Area Network (LAN) module, short distance communication module, Global Positioning System (GPS) communication module, transmitting communication module, and a wired communication module such as a High-Definition Multimedia Interface (HDMI), Universal Serial Bus (USB), Institute of Electrical and Electronics Engineers (IEEE) 1394 and so forth.

According to a control by the controller 140, the cellular communication module uses a wireless access technique according to the cellular communication module so that the terminal apparatus 100 may be connected to the peripheral terminal apparatus 20 or web server 300 through at least one or a plurality of antenna (not illustrated). Furthermore, the cellular communication module transmits/receives a wireless signal containing sound call, video call, Short Messaging Service (SMS) or Multimedia Messaging Service (MMS) message to and from a mobile phone, smart phone, tablet PC or peripheral device having telephone numbers being input to the terminal apparatus 100.

The wireless LAN module is a configuration for accessing a wireless Access Point (AP) that exists within a preset range according to a control command by the controller 140 and connecting to the internet. The wireless LAN module supports the wireless LAN standard (IEEE802.11x) of IEEE.

The short distance communication module is a configuration for performing a short distance communication wirelessly between the terminal apparatus 100 and peripheral terminal apparatus 20 or the terminal apparatus 100 and web server 300 according to a control command. Such a short distance communication module may include at least one of a bluetooth module, Infrared Data Association (IrDA) module, Near Field Communication (NFC) module, Wifi module, and Zigbee module.

As such, the communicator 110 may be embodied in various short distance communication methods, and may adopt other communication techniques that are not mentioned herein.

The wired communication module may transmit data prestored in the storage 150 of the terminal apparatus 100 or receive data from the peripheral terminal apparatus 20 or web server 300 through a connector (not illustrated).

A GPS module may calculate the location of the terminal apparatus 100 using the Time of Arrival between a GPS satellite and the terminal apparatus 100 and using GPS parameters.

The broadcasting communication module may receive a broadcasting signal (for example, TV broadcasting signal, radio broadcasting signal or data broadcasting signal) transmitted from a broadcasting station and additional information (for example Electric Program Guide (EPS) or Electric Service Guide (ESG)) through a broadcasting communication antenna according to a control command by the controller 140.

The displayer 130 may display a same web page as the at least one peripheral terminal apparatus grouping to a same group as the terminal apparatus 100. Not only that, the displayer 130 may display image data regarding multimedia contents replayed through the multimedia 160. More specifically, as illustrated in FIG. 14, the multimedia 160 is a component for replaying video contents, audio contents or other various multimedia contents, and performs replaying of multimedia contents using parser or codec and the like. For this purpose, the multimedia 160 may include a video replay module 161 and audio replay module 163.

The video replay module 161 supports various types of codec so that digital video files received from outside or prestored in the storage 150 may be replayed. That is, the video replay module 161 may support replaying a digital video file by the prestored codec according to the code type of the digital video file to be replayed. Accordingly, the displayer 130 may display image data regarding the replay processed digital video file through the video replay module 161.

The audio replay module 163 may support replay of a digital audio file (for example files having file extension names of mp3, wma, ogg or wav) received from outside or prestored according to a control command by the controller 140. Accordingly, the speaker 170 may output audio data regarding the replay processed digital audio file to outside through the audio replay module 163.

The controller 140 controls the overall operations of the configurations of the terminal apparatus 100. Especially, the controller 140 performs changing or editing of a web page displayed on the displayer 130 based on first control information input by the user through the input unit 110 and second control information received from the peripheral terminal apparatus 20 through the communicator 120. Operations of the controller 140 will be explained in detail hereinafter.

The storage 150 is a configuration of storing data, and especially, the storage 150 may include group channel information on available group channels, and device information of the peripheral terminal apparatus 20 and of the terminal apparatus grouping to a same group through a group channel. Not only that, the storage 150 may store programs related to operating systems for controlling operations of the terminal apparatus 100. When the terminal apparatus 100 is turned on, the operating system is read in the storage 150, and compiled to operate each configuration of the terminal apparatus 100.

Furthermore, the storage 150 is managed by the operating system, performs operations of the terminal apparatus 100 using resources of the operating system, and stores various applications for providing a user interface. An application program is read in the storage 150 by the operating system according an execution command of the user, is transitioned to an executable state, and performs various operations.

Furthermore, the storage 150 stores various multimedia data, contents data, data received from external source devices processed according to a control command by the controller 140. That is, the storage 150 may store a signal, information or data transmitted/received through each module that form the communicator 120.

Such a storage 150 may be embodied in at least one of a Read-Only Memory (ROM), Random-Access Memory (RAM), memory card (for example, Secure Digital (SD) card, memory stick) attachable/detachable to/from the terminal apparatus 100, nonvolatile memory, volatile memory, and Hard Disk Drive (HDD) or Solid State Drive (SSD).

The terminal apparatus 100 may further include a photographer 180 and power supply 190. The photographer 180 may include at least one camera. Such a camera may include a shutter (not illustrated), lens (not illustrated), diaphragm (not illustrated), Charge Coupled Device (CCD) image sensor (not illustrated), and Analog/Digital Converter (ADC). Such a configuration of camera is a well-known technique and thus detailed explanation thereof is omitted.

Photographer 180 that includes such a camera may photograph a still image or video through the camera, or transmit a sense signal sensed by detecting a user's motion or appearance to the controller 140. Not only that, the photographer 180 may track the user's eyes through the camera, and transmit eye track information according thereto to the controller 140.

The power supply 190 supplies power used in the terminal apparatus 100. Such a power supply 190 may be embodied in a chargeable battery, and may convert supply power from outside and charge it in the battery. Not only that, the power supply 190 may supply power to each configuration of the terminal apparatus 100 in response to various operational modes such as a maximum performance mode, general mode, saving mode, and waiting mode according to a control command by the controller 140.

Hereinafter, operations of sensing an approaching touch input of a user through the sensor 111 will be explained in further detail.

Figure 15:
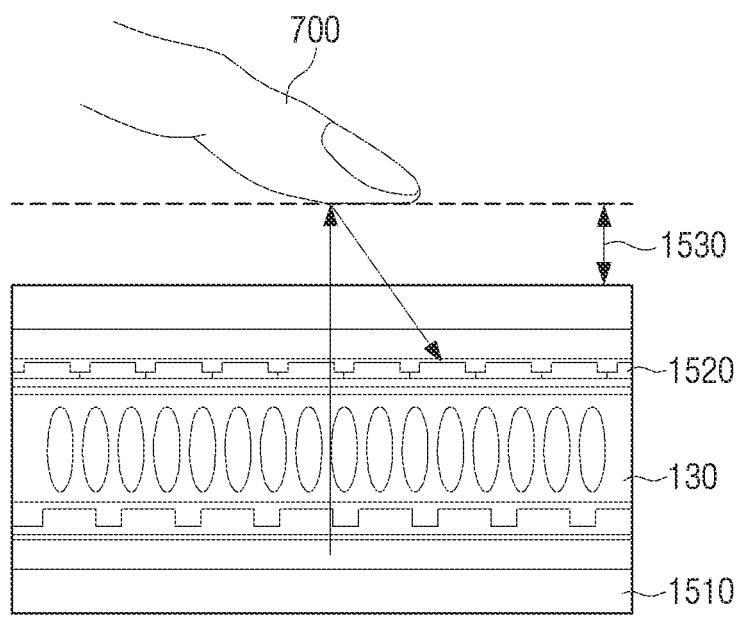
FIG. 15 is a view sensing an approaching touch input of a sensor according to an embodiment of the present disclosure.

FIG. 15 is a view sensing an approaching touch input of a sensor according an embodiment of the present disclosure.

Referring to FIG. 15, a user may input a control command to the terminal apparatus 100 with only an operation of approaching an input apparatus (not illustrated) such as a finger or touch pen to a touch screen without having to directly touching the touch screen with his/her finger 700. Accordingly, the sensor 111 may sense the user's approaching touch. An approaching touch refers to a touch gesture when a motion is recognized within a certain effective range of space without having to directly touch the touch screen.

A control command sensed by such an approaching touch may be a forenotice signal for forenoticing a corresponding web page change to the peripheral terminal apparatus 140 that displays a same web page before the controller 140 performs an operation corresponding to first control information related to web page change input through the input unit 110.

In order to sense a control command related to such a forenotice signal, the displayer 130 may have a sensor 1520 for recognizing an approaching touch in an upper part thereof and an infrared source 1510 in a lower part thereof.

The infrared source 1510 illuminates infrared ray in a surface direction of the displayer 130. More specifically, the infrared source 1510 is disposed on a lower surface of the displayer 130 that displays an image, and may illuminate an infrared ray in a surface direction of the displayer 130. There exists a certain area that may recognize approach of the user's finger 700 on the surface of the displayer 130, and this certain area maybe an effective recognition area 1530 for recognizing an approaching touch regarding the user's finger 700.

Specifically, when the user's finger 700 approaches inside of the effective recognition area 1530, the infrared sensor 1520 senses infrared ray reflected by the approaching of the user's finger 700 and creates an infrared scan image. More specifically, the infrared ray sensor 1520 may create an infrared ray scan image corresponding to the infrared ray reflected by the approaching of the user's finger 700 using a plurality of infrared sensing devices disposed in an array format.

Therefore, the sensor 111 may sense an approaching touch input regarding the user's finger 700 using the infrared scan image created by such an infrared ray sensing device, and the controller 140 may create a forenotice signal according to the user's approaching touch based on such an approaching input.

As described above, when first control information regarding a web page is input, the controller 140 changes or edits the web page according to the first control information, and when second control information regarding a web page is received, the controller 140 changes or edits the web page based on the received second control information.

As described above, the displayer 130 may display a same web page as the at least one peripheral terminal apparatus 20 grouping in a same group as the terminal apparatus 100. As such, with the same web page being displayed, when first control information is input through the input unit 110, the controller 140 transmits the first control information to the at least one peripheral terminal apparatus 20, and changes or edits the web page corresponding to the first control information input. When the first control information is input through the input unit 110, the controller 140 may change or edit the web page corresponding to the first control information input according to whether or not that terminal apparatus 100 has a control authority.

That is, of the terminal apparatus 100 and peripheral terminal apparatuses 20 that are grouped in a same group as the terminal apparatus 100 and display a same web page as the terminal apparatus 100, at least one terminal apparatus has a control authority for changing or editing a web page currently being displayed according to a user's request.

According to an embodiment of the present disclosure, the terminal apparatus 100 may be a master apparatus that groups at least one terminal apparatus 20 through a preset group channel. In such a case, the terminal apparatus 100 has a control authority for changing or editing a web page, and when a control authority request is received from the grouping peripheral terminal apparatus 20, the terminal apparatus 100 may grant a control authority for changing or editing a web page to the peripheral terminal apparatus 20 that requested that control authority. The control authority may be an authority to change or edit a web page according to the control manipulation input from the user.

Therefore, when the terminal apparatus 100 has a control authority, the controller 140 may change or edit a web page according to first control information input through the input unit 110. However, when the peripheral terminal apparatus 20 grouping in a same group has a control authority, the controller 140 does not change or edit a web page based on the first control information input through the input unit 110, but may change or edit the web page based on the second control information received from the peripheral terminal apparatus 20 granted with a control authority.

As previously mentioned, an operation of setting a group in a same group through a group channel with at least one peripheral terminal apparatus 20 and an operation of granting a control authority in the terminal apparatus 100 will be explained in detail hereinafter.

Hereinafter an embodiment of an operation according to first control information input with a control authority granted to the terminal apparatus 100 will be explained in detail.

With a same web page as the peripheral terminal apparatus 20 that is grouping being displayed, when first control information regarding the web page is input through the input unit 110, the controller 140 transmits the first control information input to the peripheral terminal apparatus 20 grouping to a same group. Then, the controller 140 changes or edits a web page based on the first control information.

When the first control information is a changing manipulation regarding a web page, the controller 140 creates a forenotice for forenoticing a web page change and transmits the created forenotice to the peripheral terminal apparatus 20 grouping to a same group. Then, after transmitting the first control information corresponding to the first control information to a corresponding peripheral terminal apparatus 20, the controller 140 may change a web page based on the first control information.

According to an embodiment of the present disclosure, when it is determined that a user's approaching touch is performed for a preset critical time, the controller 140 determines that the first control information is a changing manipulation regarding a web page, and creates a forenotice signal according thereto, and transmits the created forenotice signal to the peripheral terminal apparatus 20.

As illustrated in FIG. 15, the input unit 110 senses whether or not the user's finger 700 approached the preset effective recognition area 1530 through the sensor 111, and transmits the result to the controller 140. Accordingly, the controller 140 determines whether or not the user's finger 700 is located in the effective recognition area 1530 for a preset critical time based on the sense information transmitted through the input unit 110.

When it is determined that the user's finger is located in the effective recognition area 1530 for a preset critical time, the controller 140 may determine that a control manipulation related to changing a web page will be input, and create a forenotice signal according thereto, and transmit the created forenotice signal to the peripheral terminal apparatus grouping in a same group.

According to another embodiment of the present disclosure, when there occurs an event for inputting a keyword in a search window of a web page displayed on the screen or for inputting address information regarding a web page to be changed in an address window, the controller 140 determines that a control manipulation related to a web page change will be input, and may create a forenotice signal according thereto, and transmit the created forenotice signal to the peripheral terminal apparatus 20 grouping in a same group.

Accordingly, the peripheral terminal apparatus 20 that displays a same web page as the terminal apparatus 100 displays a notice message regarding a web page change based on the forenotice signal received from the terminal apparatus 100. Accordingly, the user of the peripheral terminal apparatus 20 may predict that the web page currently displayed will be changed to a new web page.

After such a forenotice signal is transmitted, when a user's touch is sensed or first control information for inputting a text is input through the input unit 110, the controller 140 transmits the first control information input to the peripheral terminal apparatus 20 that transmitted the forenotice signal. The first control information may include URL information regarding the web page to change. After the first control information is transmitted, the controller 140 requests a web page corresponding to the preinput first control information to the web server 300. Accordingly, the displayer 130 may change the web page currently being displayed to a web page corresponding to the first control information and display the result.

The peripheral terminal apparatus 20 may request a web page to the web server 300 based on the first control information received from the terminal apparatus 100, change to the requested web page, and display the result. Accordingly, the terminal apparatus 100 and the peripheral terminal apparatus 20 may change a web page to a same web page and display the result.

As such, after transmitting first control information corresponding to the first control information to the terminal apparatus 200 grouping in a same group, the terminal apparatus 100 according to an embodiment of the present disclosure requests a web page according to the first control information to the web server, thereby synchronizing the timing for requesting a web page to the web server 300 in the terminal apparatus 100 and the peripheral terminal apparatus 20.

Hereinafter, an embodiment of performing an operation according to second control information received from the peripheral terminal apparatus 20 with a control authority granted to the peripheral terminal apparatus 20 grouping in a same group with the terminal apparatus 100 will be explained in detail.

When a forenotice signal for forenoticing a web page change is received from the peripheral terminal apparatus 20 granted with a control authority, the controller 140 controls the displayer 130 to display a notice message that notices a web page change. Accordingly, the displayer 130 displays a notice message forenoticing the web page change on one side area of the screen. After such a notice message is displayed, when second control information for a web page change is received from the peripheral terminal apparatus 20 granted with a control authority, the controller 140 requests a web page corresponding to the URL information included in the second control information received from the web server 300 and displays the result.

The operation of transmitting a forenotice signal and control signal related to a web page change in the peripheral terminal apparatus 20 granted with a control authority to the terminal apparatus 100 is the same as the operation in the terminal apparatus 100. Therefore, detailed explanation on the operation of transmitting a forenotice signal and control signal related to a web page change in the peripheral terminal apparatus 20 granted with a control authority to the terminal apparatus 100 will be omitted.

When the first control information input through the input unit 110 is an editing manipulation regarding a web page, the controller 140 may transmit the first control information related to the editing manipulation to the corresponding peripheral terminal apparatus 20, and edit the web page based on the corresponding first control information.

Herein, the first control information related to editing may include a scroll control manipulation, text input manipulation, drag manipulation, and manipulation related to a user's focusing regarding a web page.

For example, when a scroll control manipulation regarding a web page is input, the controller 140 changes the location regarding the web page displayed in response to the scroll control manipulation input. The controller 140 may transmit first control information including location information regarding the web page to the peripheral terminal apparatus 20. Accordingly, the peripheral terminal apparatus 20 may change the location regarding the web page currently being displayed based on the location information included in the first control information received from the terminal apparatus 100. That is, the peripheral terminal apparatus 20 that is grouping in a same group as the terminal apparatus 100 may perform a scroll control operation regarding a web page in the same manner as the scroll control operation regarding the web page of the terminal apparatus 100.

By way of another example, when a control manipulation regarding a text input is input into an area besides a search window and address window by the user, the controller 140 may display a text input by the user on the screen where the web page is displayed based on the control manipulation input. The controller 140 transmits the text information displayed on the screen and the first control information including the location information where the corresponding text is displayed to the peripheral terminal apparatus 20. Accordingly, the peripheral terminal apparatus 20 may display on the screen where the web page is displayed a same text as the text displayed on the terminal apparatus 100 based on the text information and location information included in the first control information received from the terminal apparatus 100.

By way of another example, as illustrated in FIG. 10, when a control manipulation of dragging a certain context message displayed on the web page from left to right is input, the controller 140 may perform an editing operation of displaying an underline underneath the corresponding context message based on the input control manipulation. The controller 140 transmits the first control information including a coordinate value of a touch area initially touched by the user and a coordinate value of a touch area finally touched by the user regarding the corresponding context message to the peripheral terminal apparatus 20. Accordingly, of the context message displayed on the web page, the peripheral terminal apparatus 100 may display a highlight on the context message corresponding to the coordinate value included in the first control information received from the terminal apparatus 100. Accordingly, the peripheral terminal apparatus 20 may check the part instructed by the user of the terminal apparatus 100 more easily and quickly.

By way of another example, the input unit 110 may receive an input of a user's utterance voice regarding a certain context message displayed on the web page through a microphone 115. When such an utterance voice is input, the controller 140 recognizes the input utterance voice, obtains location information regarding the context message corresponding to the recognized voice information, and transmits the first control information corresponding to the obtained location information to the peripheral terminal apparatus 20. Accordingly, of the context message displayed on the web page, the peripheral terminal apparatus 20 may display serial information such as a highlight on the context message corresponding to the location information included in the first control information. Accordingly, the peripheral terminal apparatus 20 may check the portion instructed by the user of the terminal apparatus 100 more easily and quickly.

Hereinafter, an operation of grouping in a same group as at least one peripheral terminal apparatus 20 in the terminal apparatus 100 will be explained in detail.

The terminal apparatus 100 may receive and display a web page that the user requested from the web server 300 through the displayer 130. With the web page being displayed, when a user command for sharing the web page is input through the input unit 110, the controller 140 searches an available channel, and when an available channel is searched, sets the channel as a group channel, and stores group channel information regarding the set group channel in the storage 150.

More specifically, the controller 140 transmits a request signal for requesting group channel information regarding a preset group channel by broadcasting through a common use channel, according to a user command. The peripheral terminal apparatus 20 within a preset range with the terminal apparatus 100 may receive the request signal transmitted from the terminal apparatus 100, and of the peripheral terminal apparatus 20 that received the request signal, at least one peripheral terminal apparatus 20 having a preset group channel transmits group channel information regarding the preset group channel to the terminal apparatus 100. Accordingly, the terminal apparatus 100 may set a group channel regarding an available channel based on the group channel information received from the at least one peripheral terminal apparatus 20 through the common use channel.

When a group channel is set, the controller 140 searches at least one terminal apparatus 20 through the common use channel, and of the peripheral terminal apparatuses 20 searched, groups the peripheral terminal apparatus 20 that requested group subscription in a same group as the terminal apparatus 100. Then, the controller 140 stores in the storage 150 device information received by transmitting from the peripheral terminal apparatus 20 grouping in a same group through the group channel.

More specifically, when a group channel is set, the controller 140 transmits a search signal for searching the peripheral terminal apparatus by transmitting through the common use channel. The peripheral terminal apparatus 20 that received the search signal transmits a response signal to the terminal apparatus through the common use channel based on the received search signal. The terminal apparatus 100 that received the response signal transmits an advertisement message to the peripheral terminal apparatus 20 that transmitted the response signal through the common use channel. However, there is no limitation thereto, and thus of the plurality of peripheral terminal apparatuses 20 that transmitted the response signal, the controller 140 may selectively transmit an advertisement message to a certain peripheral terminal apparatus 20. The advertisement message may be guide information regarding the web page currently being displayed on the terminal apparatus 100.

Therefore, when such an advertisement message is received, the peripheral terminal apparatus 20 may display the advertisement message received on the screen, and the user of the peripheral terminal apparatus 20 may determine whether or not to share the web page being displayed on the terminal apparatus 100 through the advertisement message displayed on the screen.

When a share command regarding a web page is input, the peripheral terminal apparatus 20 requests group subscription to the terminal apparatus 100 that transmitted the advertisement message through a share channel, and accordingly, the controller 140 sets a group for sharing a web page with the peripheral terminal apparatus 20 that requested group subscription through a preset group channel. Furthermore, the controller 130 transmits a response message including group channel information regarding the preset group channel. Accordingly, the terminal apparatus 100 and peripheral terminal apparatus 20 may perform data communication for sharing a web page through the preset group channel.

As such, with a grouping for sharing a web page with at least one peripheral terminal apparatus 20 through a preset group channel, the controller 140 may receive a search signal from at least one peripheral terminal apparatus 20 not grouping with the terminal apparatus 100. When such a search signal is received, the controller 140 may transmit a response signal to the peripheral terminal apparatus 20 that transmitted the search signal. The response signal may include guide information regarding the web page currently being displayed on the terminal apparatus 100. Then, when a group subscription request is received from the peripheral terminal apparatus 20 that received the response signal, the controller 140 performs an operation of adding the peripheral terminal apparatus 20 that requested group subscription to the preset group.

When a group withdrawal message is received from at least one peripheral terminal apparatus 20 grouping in a same group, the controller 140 releases the grouping of the peripheral terminal apparatus that transmitted the group withdrawal message. That is, when a group withdrawal message is received from at least one peripheral terminal apparatus 20 grouping in a same group, of the device information stored in the storage, the controller 140 may remove device information of the peripheral terminal apparatus 20 that transmitted the group withdrawal message, and transmit a response message noticing withdrawal from the group to the peripheral terminal apparatus 20 that transmitted the group withdrawal message. The device information stored in the storage 150 maybe information regarding all peripheral terminal apparatuses 20 grouping in a same group as the terminal apparatus 100.

When a group that shares a web page with at least one peripheral terminal apparatus that is grouping through a preset group channel withdraws from the group, the controller 140 may transmit a message related to group release by transmitting through the group channel. Accordingly, all peripheral terminal apparatuses 20 that are grouping in a same group as the terminal apparatus 100 may perform withdrawal from the group based on the message related to group release received from the terminal apparatus 100 through the group channel.

When a search signal is received from the peripheral terminal apparatus 20 that operates as a master apparatus, the controller 140 transmits a response signal in response to the search signal. The peripheral terminal apparatus 20 that operates as the master apparatus is a terminal apparatus for sharing the web page currently being displayed with another peripheral terminal apparatus 20 through a preset group channel. When a search signal is received from such a peripheral terminal apparatus 20 that operates as a master apparatus, the controller 140 transmits the response signal to the peripheral terminal apparatus 20 that transmitted the search signal through a share channel. Then, when an advertisement message is received from the peripheral terminal apparatus that operates as the master apparatus, the controller 140 requests a grouping to the peripheral terminal apparatus 20 that transmitted the advertisement message according to the user command. Then, when a response message including group channel information is received from the peripheral terminal apparatus that operates as the master apparatus, the controller 140 may transceive data related to web page sharing with the peripheral terminal apparatus 20 that operates as the master apparatus through a preset group channel from the peripheral terminal apparatus 20 that operates as the master apparatus.

According to the user's request, the controller 140 may transmit a search signal for searching the peripheral terminal apparatus 20 that operates as the master apparatus by transmitting through a common use channel. When the search signal is received from the terminal apparatus 100, at least one peripheral terminal apparatus 20 that operates as the master apparatus transmits a response signal to the terminal apparatus 100 based on the received search signal. The response signal may include an advertisement message regarding the web page currently being displayed on the peripheral terminal apparatus 20 that operates as the master apparatus.

As such, when the response signal is received from at least one peripheral terminal apparatus 20 that operates as the master apparatus, the controller 130 transmits a group subscription request to a peripheral terminal apparatus 20 that the user selected of the at least one peripheral terminal apparatuses 20 that transmitted the response signal. Then, when the response message regarding allowing group subscription is received from the peripheral terminal apparatus 20 that received the group subscription request, the controller 130 may transceive data for web page sharing with the peripheral terminal apparatus 20 through a group channel based on the group channel information included in the response message.

Hereinafter, an operation of granting a control authority for changing or editing a web page in a terminal apparatus 100 that displays a same web page with at least one peripheral terminal apparatus grouping in a same group will be explained.

The terminal apparatus 100 and at least one peripheral terminal apparatus 20 may be set in a same group and display a same web page. When grouping in a same group as at least one peripheral terminal apparatus 20 through a preset group channel, the terminal apparatus 100 may be granted with a first control authority for changing or editing a web page. As such, with a control authority granted, when a request message for control authority is received from the peripheral terminal apparatus 20 grouping in a same group, the controller 140 grants a control authority to the peripheral terminal apparatus 20 that transmitted the request message for control authority. Then, the controller performs control holding so as not to perform an operation corresponding to a manipulation command related to changing or editing a web page. Furthermore, the controller 140 displays a notice message noticing that a control authority is granted to the peripheral terminal apparatus 20 on the screen. Accordingly, the user of the terminal apparatus 100 may recognize that it is not possible to perform a manipulation related to changing or editing a web page through his/her terminal apparatus.

The peripheral terminal apparatus 20 that is granted with the control authority from the terminal apparatus 100 determines whether or not a control manipulation command related to changing or editing a web page is input within a preset critical time. As a result, when it is determined that a control manipulation command is input within a preset critical time, the peripheral terminal apparatus 20 maintains the control authority. When it is determined that a control manipulation command is not input within a preset critical time, the peripheral terminal apparatus 20 releases the control authority regarding the web page and transmits a notice message of release of control authority according thereto to the terminal apparatus 100 that is the master apparatus. Accordingly, the controller 140 may perform a control setting at an initial state having a control authority regarding the web page, and remove a notice message displayed on the screen, and thus the user of the terminal apparatus 100 may recognize that there is a control authority regarding the web page currently being displayed.

As described above, the configuration of the terminal apparatus 100 that share a web page with a peripheral terminal apparatus 20 that is grouping was explained in detail. Hereinafter, a method for displaying a same web page as the peripheral terminal apparatus 20 that is grouping in the terminal apparatus 100 will be explained in detail with reference to FIGS. 16 to 21.

Figure 16:
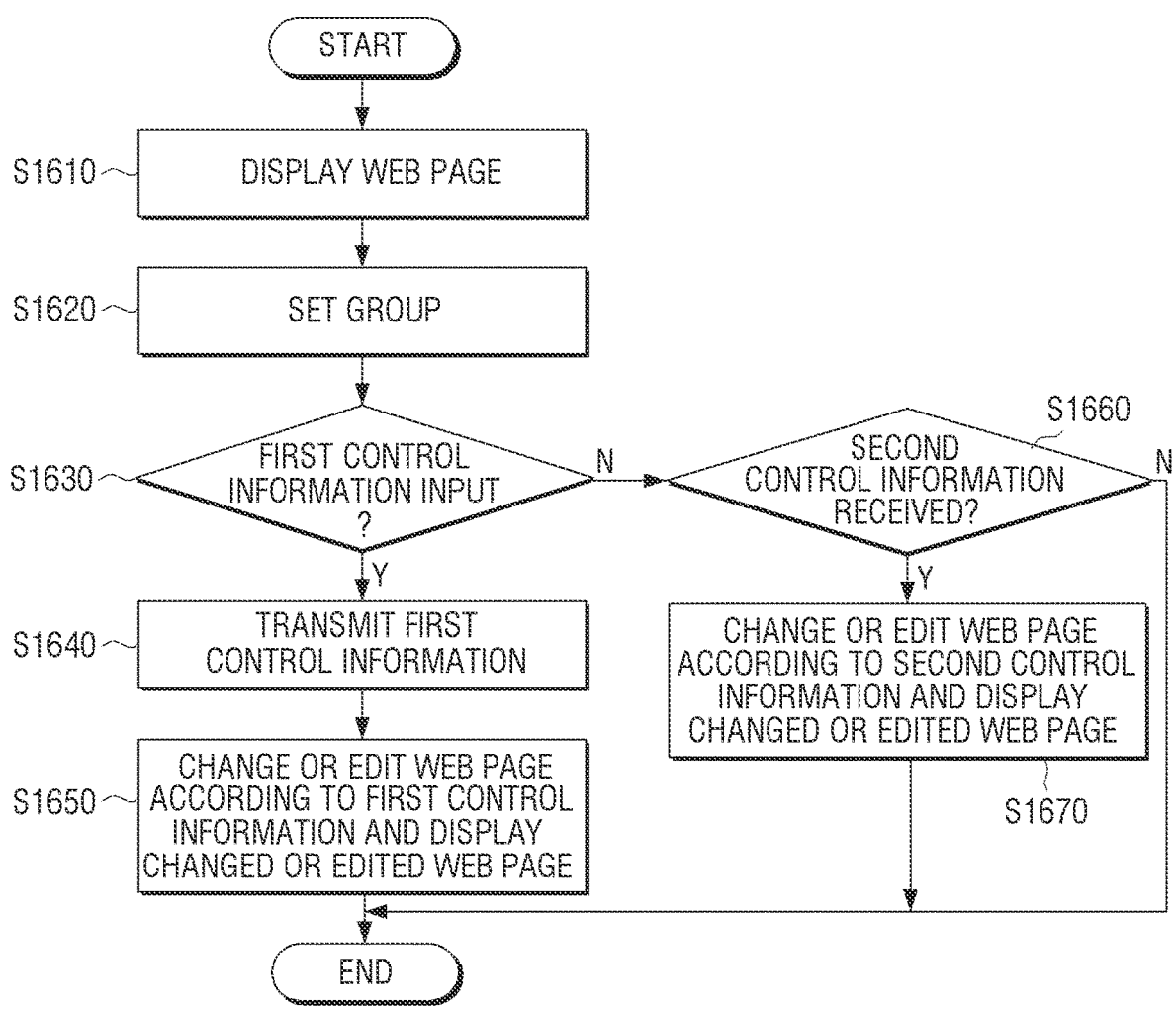
FIG. 16 is a flowchart of a method for displaying a same web page as a peripheral terminal apparatus a grouping in a terminal apparatus according to an embodiment of the present disclosure.

FIG. 16 is a flowchart of a method for displaying a same web page as a peripheral terminal apparatus grouping in a terminal apparatus according an embodiment of the present disclosure.

Referring to FIG. 16, the terminal apparatus 100 receives a web page that a user requested from a web server 300 and displays the web page at operation S1610. With such a web page being displayed, when a user command related to sharing a corresponding web page is input from the user, the terminal apparatus 100 sets a group channel for sharing a web page with at least one peripheral terminal apparatus 20, and grouping at least one peripheral terminal apparatus 20 in a same group based on the set group channel at operation S1620.

As such, grouping in a same group as at least one peripheral terminal apparatus 20, the terminal apparatus 100 determines whether or not first control information is input from the user at operation S1630. As a result, if it is determined that first control information is input, the terminal apparatus 100 transmits the first control information input to at least one peripheral terminal apparatus 20 that is grouping in a same group through a preset group channel at operation S1640. Then, the terminal apparatus 100 performs changing or editing of a web page currently being displayed, and displays the result at operation S1650.

As such, when first control information is input, the terminal apparatus 100 according to the present disclosure transmits the first control information input to at least one peripheral terminal apparatus 20 that is grouping in a same group before performing a control operation that corresponds to the first control information. Accordingly, the timing of requesting a web page to the web server 300 or editing a web page from the terminal apparatus 100 and the peripheral terminal apparatuses 20 may be synchronized.

When first control information is not input at operation S1630, the terminal apparatus 100 determines whether or not second control information is received from the peripheral terminal apparatus 20 that is grouping in a same group at operation S1660. As a result, if it is determined that second control information is received, the terminal apparatus 100 changes or edits the web page according to the second control information and displays the result at operation S1670.

For the terminal apparatus 100 to perform an operation of changing or editing a web page through operations S1630 to S1650 according to the first control information input from the user, the terminal apparatus 100 must be granted with a control authority. That is, when first control information is input from the user with a control authority granted to the terminal apparatus 100, the terminal apparatus 100 may transmit the first control information input to a peripheral terminal apparatus 20 that is grouping in a same group, and then change or edit a web page according to the first control information.

However, the present disclosure is not limited thereto, and when a control authority request is not received from at least one peripheral terminal apparatus 20 that is grouping in a same group, the terminal apparatus 100 that is the master apparatus 100 may change or edit a web page according to the first control information input.

If a control authority is not granted to the terminal apparatus 100, the terminal apparatus 100 disregards the first control information input from the user. When a control authority is requested from the peripheral terminal apparatus that is grouping in a same group, the terminal apparatus 100 may grant a control authority to the peripheral terminal apparatus 20 that requested the control authority. Accordingly, when second control information is input from the user, the peripheral terminal apparatus 20 that is granted with the control authority may transmit the second control information input to the terminal apparatus 100. Accordingly, when it is determined that second control information is received at operation S1660, the terminal apparatus 100 may change or edit a web page according to the received second control information.

Figure 17:
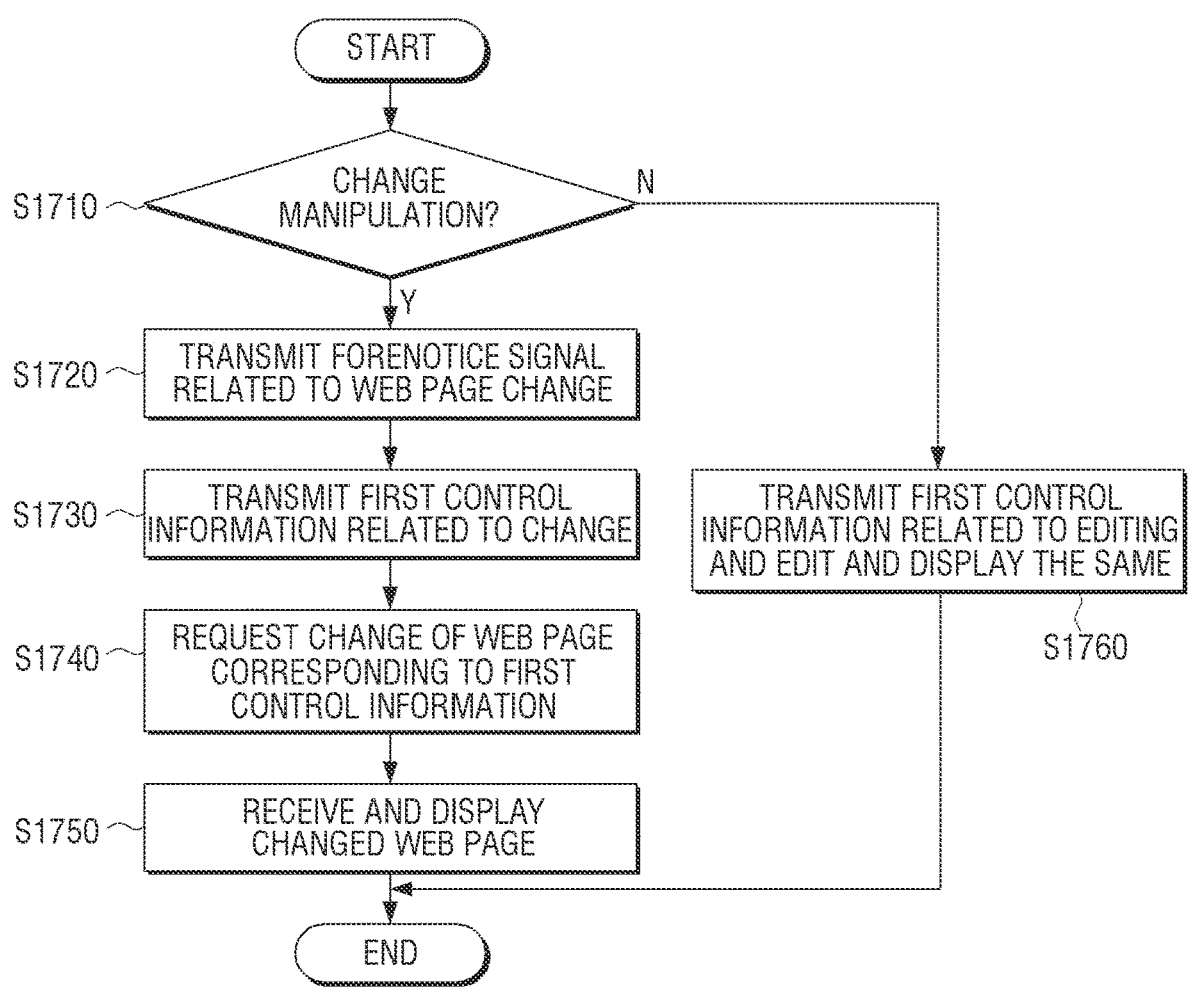
FIG. 17 is a flowchart of a method for changing or editing a web page based on a control manipulation in a terminal apparatus according to an embodiment of the present disclosure.

FIG. 17 is a flowchart of a method for changing or editing a web page based on a control manipulation in a terminal apparatus according an embodiment of the present disclosure.

Referring to FIG. 17, when first control information is input from the user, the terminal apparatus 100 granted with a control authority determines whether the first control information input is a changing manipulation or editing manipulation of a web page at operation S1710.

If it is determined that the first control information input is a changing manipulation of a web page, the terminal apparatus 100 creates a forenotice signal for forenoticing a web page change, and transmits the created forenotice signal to the peripheral terminal apparatus 20 that is grouping in a same group through a preset group channel at operation S1720. Accordingly, the peripheral terminal apparatus 20 that displays a same web page as the terminal apparatus 100 displays a notice message noticing a web page change based on the forenotice signal received from the terminal apparatus 100 on the screen. Accordingly, the user of the peripheral terminal apparatus 20 may predict that the web page currently being displayed will be changed to a new web page.

The terminal apparatus 100 that transmitted the forenotice signal to the peripheral terminal apparatus 20 that is grouping transmits the first control information input to the peripheral terminal apparatus 20 through the group channel at operation S1730. The first control information may include URL information regarding the new web page. Then, the terminal apparatus 100 requests a web page corresponding to the first control information at operation S1740 and receives the web page from the web server 300, and changes the web page to the received web page and displays the result (S1750).

The peripheral terminal apparatus 20 that received the first control information from the terminal apparatus 100 requests a web page to the web server 300 based on the URL information included in the first control information received and displays the requested web page. Accordingly, the terminal apparatus 100 and the peripheral terminal apparatus 20 may change a web page to a same web page and display the result.

When the first control information input from the user at operation S1710 is a control manipulation related to editing, the terminal apparatus 100 transmits the input first control information related to editing to the peripheral terminal apparatus 20 through the group channel at operation S1760. Then, the terminal apparatus 100 performs editing of a web page displayed on the screen based on the first control information related to editing. The peripheral terminal apparatus 20 that received the first control information related to editing from the terminal apparatus 100 through the group channel performs editing of the web page based on the corresponding first control information.

As such, when the first control information related to editing a web page is input, the terminal apparatus 100 transmits the input first control information to the peripheral terminal apparatus 20, and performs editing of the web page based on the first control information input. Therefore, the timing of performing editing of a web page being displayed on the screen in the terminal apparatus 100 and the peripheral terminal apparatus 20 may be synchronized.

Figure 18:
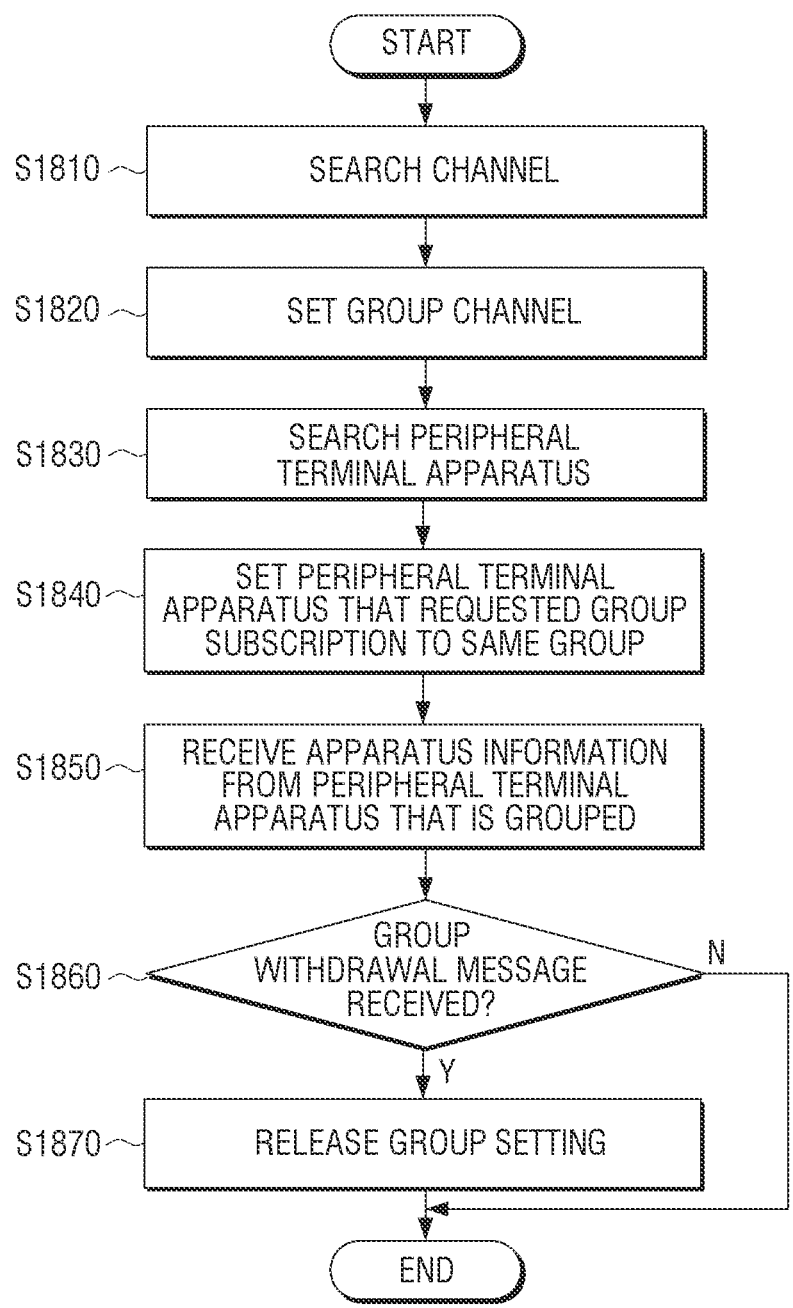
FIG. 18 is a flowchart of a method for performing a grouping to a same group as a peripheral terminal apparatus in a terminal apparatus according to an embodiment of the present disclosure.

FIG. 18 is a flowchart of a method for performing a grouping to a same group as a peripheral terminal apparatus in a terminal apparatus according an embodiment of the present disclosure.

Referring to FIG. 18, the terminal apparatus 100 that operates as a master apparatus searches an available channel according to a user's request at operation S1810. Then, the terminal apparatus 100 sets a group channel based on the searched available channel at operation S1820.

More specifically, with the web page requested by the user through the web server 300 being displayed, the terminal apparatus 100 may receive a user command for sharing a corresponding web page from the user. When such a user command is input, the terminal apparatus 100 transmits a request signal for requesting group channel information through the common use channel by transmitting. Therefore, the peripheral terminal apparatus within a preset range with the terminal apparatus 100 may receive a request signal transmitted from the terminal apparatus 100, and of the peripheral terminal apparatuses that received a request signal, the peripheral terminal apparatus 20 that preset a group channel may transmit the group channel information regarding the preset group channel to the terminal apparatus through a common use channel. Accordingly, the terminal apparatus 100 may set a group channel regarding an available channel based on the group channel information received through the common use channel.

When such a group channel is set, the terminal apparatus 100 searches at least one peripheral terminal apparatus 20 through a common use channel, and of the searched peripheral terminal apparatuses 20, groups the peripheral terminal apparatus 20 that requested group subscription in a same group as the terminal apparatus 20 at operations S1830 and S1840. Then, the terminal apparatus 100 receives device information of the peripheral terminal apparatus 20 from the peripheral terminal apparatus 20 that is grouping through a group channel and stores the same at operation S1850.

More specifically, when a group channel is set through searching of an available channel, the terminal apparatus 100 transmits a search signal for searching a peripheral terminal apparatus 20 within a preset range by transmitting through a common use channel, and receives a response signal from at least one peripheral terminal apparatus 20 that received the search signal. When such a response signal is received, the terminal apparatus 100 transmits an advertisement message to the peripheral terminal apparatus 20 that transmitted the response signal through the common use channel based on the address information included in the received response signal. The advertisement message may be guide information regarding the web page currently being displayed on the terminal apparatus 100.

Then, when there is a request for group subscription from the at least one peripheral terminal apparatus 20 that received the advertisement message through the common use channel, the terminal apparatus 100 sets a group for sharing a web page with the peripheral terminal apparatus 20 that requested group subscription through the preset group channel. Then, when there is a group subscription request from the at least one peripheral terminal apparatus 20 that received the advertisement message through the common use channel, the terminal apparatus 100 sets a group for sharing a web page with the peripheral terminal apparatus 20 that requested group subscription through the preset group channel. Then, the terminal apparatus 100 transmits group channel information regarding the preset group channel to the peripheral terminal apparatus 20 that requested group subscription through the common use channel. Accordingly, the terminal apparatus 100 and the peripheral terminal apparatus 20 may perform data communication for sharing a web page through a preset group channel.

When a group withdrawal message is received from at least one peripheral terminal apparatus 20 that is grouping in a same group, the terminal apparatus 100 releases grouping of the peripheral terminal apparatus that transmitted the group withdrawal message at operations S1860 and S1870. More specifically, when a group withdrawal message is received from at least one peripheral terminal apparatus 20 grouping in a same group, of the device information of the plurality of peripheral terminal apparatuses 20, the terminal apparatus 100 removes the device information of the peripheral terminal apparatus 20 that transmitted the group withdrawal message, and transmits a response message noticing a group withdrawal to the peripheral terminal apparatus 20.

When the terminal apparatus 100 that shares a web page with at least one peripheral terminal apparatus 20 through a preset group channel withdraws from the group, the terminal apparatus 100 may transmit a message related to group release by transmitting through a group channel. Accordingly, all peripheral terminal apparatuses that are grouping in a same group with the terminal apparatus may perform group withdrawal based on the message related to group release received from the terminal apparatus 100 through the group channel.

Figure 19:
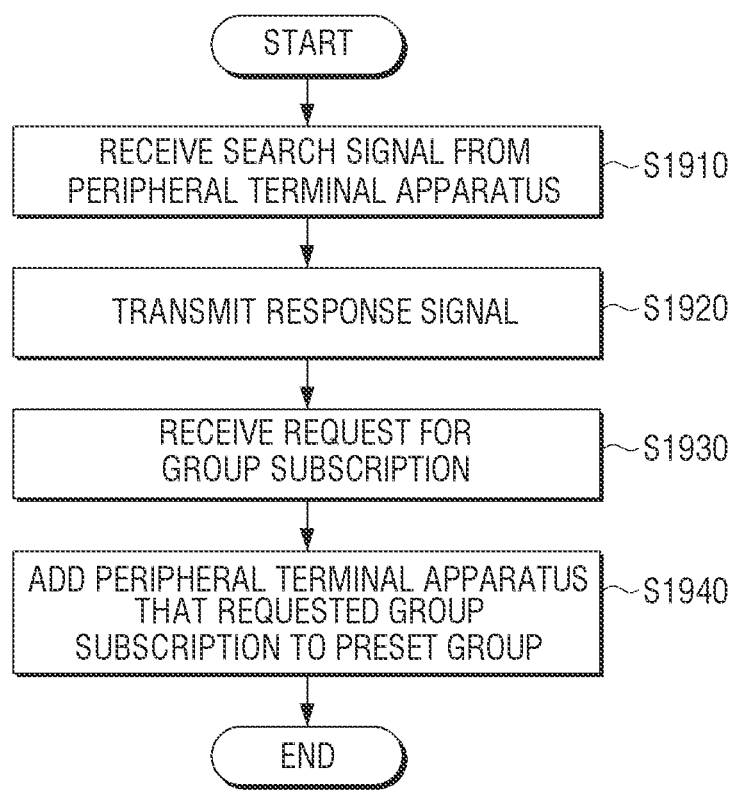
FIG. 19 is a flowchart of a method for grouping a peripheral terminal apparatus to a same group in a terminal apparatus according to an embodiment of the present disclosure.

FIG. 19 is a flowchart of a method for grouping a peripheral terminal apparatus to a same group in a terminal apparatus according an embodiment of the present disclosure.

Referring to FIG. 19, grouping in a same group as the at least one peripheral terminal apparatus 20, when a search signal is received from another peripheral terminal apparatus 20 that is not grouping through a common use channel, the terminal apparatus 100 transmits a response signal to the peripheral terminal apparatus 20 that transmitted the search signal through the common use channel based on the search request message included in the received search signal at operations S1910 and S1920. The response signal may include address information and serial information of the terminal apparatus 100. However, there is not limitation thereto, and the response information may further include guide information regarding the web page currently being displayed on the terminal apparatus 100. According to a user's request, the peripheral terminal apparatus 20 that received such a response signal requests group subscription to the terminal apparatus 100 that transmitted the response signal through the common use channel. When such a group subscription request is received, the terminal apparatus 100 adds the corresponding peripheral terminal apparatus 20 to a preset group based on the group subscription request received from the peripheral terminal apparatus 20, and transmits group channel information regarding the preset group channel to the corresponding peripheral terminal apparatus 20 through the common use channel at operations S1930 and S1940. Accordingly, the terminal apparatus 100 may perform data communication for sharing a web page with a peripheral terminal apparatus 20 that is previously grouping and peripheral terminal apparatus 20 that is newly added to the group through a preset group and channel.

Figure 20:
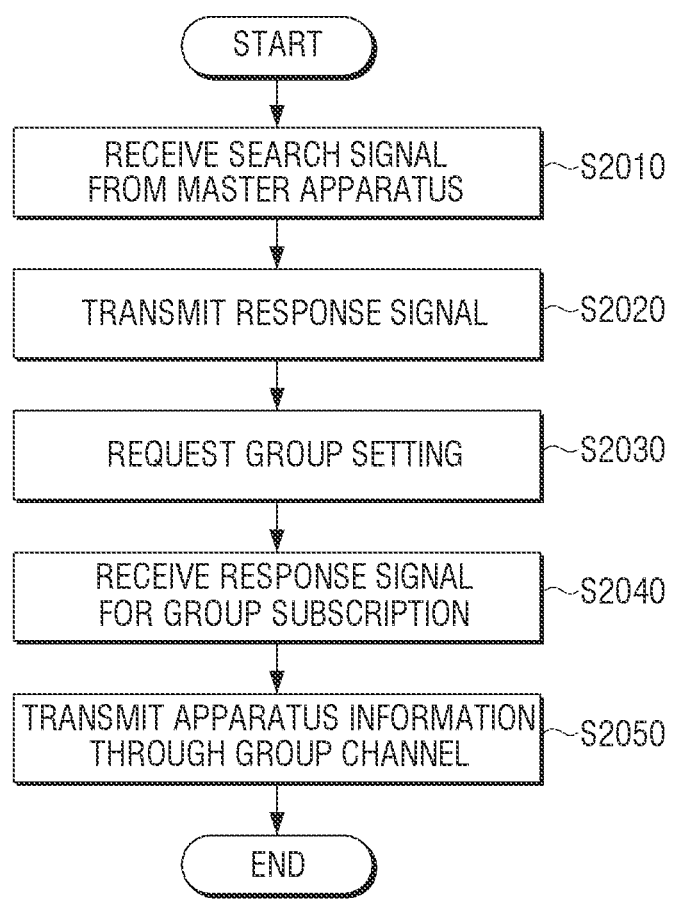
FIG. 20 is a flowchart of a method for grouping between a terminal apparatus and a peripheral terminal apparatus operating as a master apparatus according to an embodiment of the present disclosure.

FIG. 20 is a flowchart of a method for grouping between a terminal apparatus and a peripheral terminal apparatus operating as a master apparatus according an embodiment of the present disclosure.

Referring to FIG. 20, when a search signal is received from the peripheral terminal apparatus 20 that operates as the master apparatus through a common use channel, the terminal apparatus 100 transmits a response signal to the peripheral terminal apparatus 20 that transmitted the search signal at operations S2010 and S2020. The response signal may include an advertisement message regarding a web page currently being displayed on the peripheral terminal apparatus 20 that operates as the master apparatus.

However, there is no limitation thereto, and the peripheral terminal apparatus 20 that received a response signal from the terminal apparatus may transmit an advertisement message related to a web page currently being displayed on the peripheral terminal apparatus 20 to the terminal apparatus 100 based on the response signal received. Accordingly, the user of the terminal apparatus 100 may check the web page currently being displayed, determine whether or not to share the web page, and request a grouping with the peripheral terminal apparatus 20 that operates as the master apparatus in the peripheral terminal apparatus 20 that operates as the master apparatus. According to such a user's request, the terminal apparatus 100 requests grouping to the peripheral terminal apparatus 20 that operates as the master apparatus at operation S2030. Accordingly, when a response signal regarding group subscription is received from the peripheral terminal apparatus 20 that operates as the master apparatus, the terminal apparatus 100 transmits the device information of the terminal apparatus 100 through the preset group channel in the peripheral terminal apparatus 20 that operates as the master apparatus at operations S2040 and S2050.

As such, when a response signal is received from at least one peripheral terminal apparatus that operates as the master apparatus, the terminal apparatus 100 transmits a subscription request to the peripheral terminal apparatus 20 selected by the user of the at least one peripheral terminal apparatuses 20 that transmitted a response signal. Then, when a response signal regarding allowing group subscription is received from the peripheral terminal apparatus that received the group subscription request, the terminal apparatus 100 may transceive data for sharing a web page with the peripheral terminal apparatus 20 that operates as the master apparatus through the preset group channel based on the group channel information included in the response signal.

Figure 21:
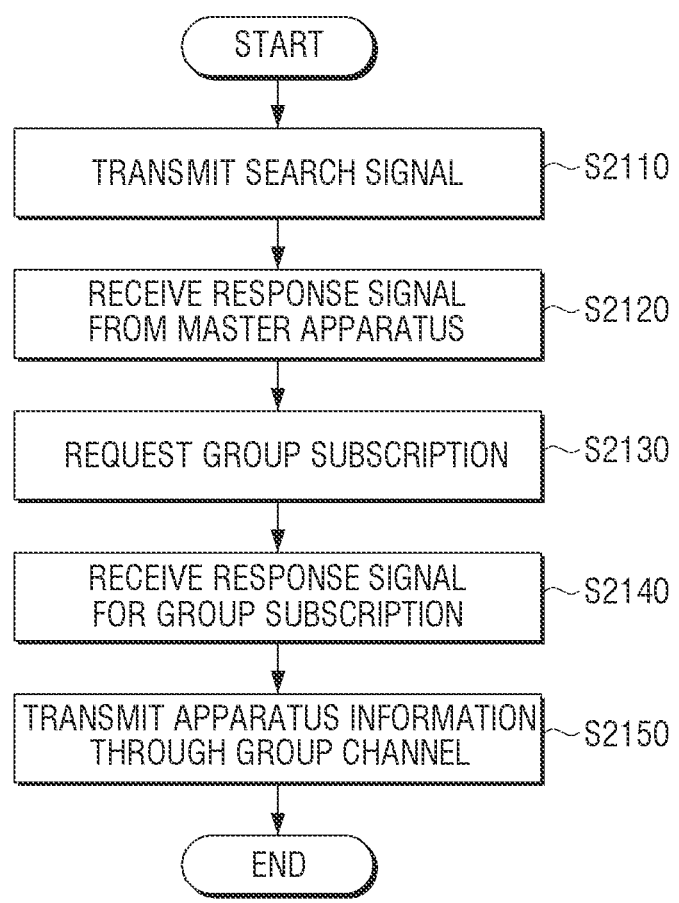
FIG. 21 is a flowchart of a method for subscribing to a grouping to a peripheral terminal apparatus operating as a master apparatus in a terminal apparatus according to an embodiment of the present disclosure.

FIG. 21 is a flowchart of a method for subscribing to a grouping to a peripheral terminal apparatus operating as a master apparatus in a terminal apparatus according an embodiment of the present disclosure.

Referring to FIG. 21, according to a user's request, the terminal apparatus 100 may transmit a search signal regarding the peripheral terminal apparatus 20 that operates as the master apparatus through a common use channel by transmitting at operation S2110. Then, when a response signal in response to a search signal is received from the at least one peripheral terminal apparatus 20 that operates as the master apparatus, the terminal apparatus 100 requests group subscription to the peripheral terminal apparatus 20 that transmitted the response signal at operations S2120 and S2130. Accordingly, the peripheral terminal apparatus 20 that operates as the master apparatus further sets the terminal apparatus 100 in a previously set group. Then, when a response signal allowing group subscription is received from a peripheral terminal apparatus 20 that requested group subscription, the terminal apparatus 100 transmits device information of the terminal apparatus 100 through the preset group channel in the peripheral terminal apparatus 20 that operates as the master apparatus by transmitting at operations S2140 and S2150.

The terminal apparatus 100 may perform data communication for web page sharing with a peripheral terminal apparatus 20 that operates as the master apparatus through a preset group channel.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of displaying a web page in an electronic device, the method comprising:
   displaying the web page at the electronic device;
   setting, by the electronic device, a group channel for sharing the web page based on port information received from at least one external device;
   transmitting information of the web page to the at least one external device through the group channel set by the electronic device to display the web page at the at least one external device;
   receiving an input of first control information regarding the web page on the web page;
   in a case that the electronic device has a control authority after receiving the input of first control information regarding the web page, transmitting the first control information directly to the at least one external device through the group channel set by the electronic device before performing one of changing or editing the web page according to the first control information regarding the web page;
   in a case that the electronic device does not have the control authority after receiving the input of first control information regarding the web page, disregarding, by the electronic device, the first control information regarding the web page, receiving, by the electronic device, second control information regarding the web page from the at least one external device through the group channel set by the electronic device, and performing one of changing or editing the web page according to the second control information; and
   in response to receiving a forenotice signal for forenoticing a web page change from the at least one external device before receiving the second control information, displaying a notice message noticing a web page change before performing the one of changing or editing of the web page, the forenotice signal being a signal forenoticing the web page change.

2. The method of claim 1, wherein the performing of the one of changing or editing of the web page according to the first control information comprises, in response to receiving the input of first control information, performing one of changing or editing the web page after transmitting the first control information to the at least one external device.

3. The method of claim 2, wherein the first control information is input with the electronic device having one of the control authority or a control authority request not received from the at least one external device.

4. The method of claim 2, wherein the performing of the one of changing or editing of the web page according to the first control information comprises:
in response to the first control information being a changing manipulation for changing the web page, transmitting the forenotice signal for forenoticing the web page change to the at least one external device;
transmitting the first control information corresponding to the changing manipulation to the at least one external device; and
changing the web page according to the changing manipulation.

5. The method of claim 1, further comprising:
in response to a control authority request being received from the at least one external device, granting the control authority to the at least one external device that transmitted the control authority request.

6. The method of claim 1, further comprising setting a group by grouping the electronic device and the at least one external device.

7. The method of claim 6,
wherein the setting of the group comprises:
searching for an available channel in response to the electronic device being a master apparatus;
setting the available channel to the group channel;
searching for the at least one external device through a common use channel; and
in a case that the at least one external device requests a group subscription, grouping the at least one external device in a same group as the electronic device, and
wherein each of the at least one external device grouped in the same group receive device information being transmitted through the group channel.

8. The method of claim 7, further comprising:
in response to receiving a search signal from the at least one external device, transmitting a response signal to the at least one external device that transmitted the search signal; and
in response to a group subscription request being received from the at least one external device that received the response signal, adding the at least one external device that requested the group subscription to the same group as the electronic device.

9. The method of claim 1,
wherein the editing of the web page comprises at least one of a web page scroll control manipulation, text input manipulation, drag manipulation, or user's focusing related manipulation, and
wherein the changing of the web page comprises changing the web page to a new web page.

10. The method of claim 1, wherein the at least one external device transmits the forenotice signal to the electronic device before transmitting the second control information to the electronic device.

11. The method of claim 1, further comprising, in response to receiving the forenotice signal from the at least one external device before receiving the second control information, displaying the notice message noticing the web page change in a window overlaying the web page displayed at the electronic device.

12. An electronic device comprising:
an interface configured to receive an input of first control information regarding a web page, the input being received on the web page;
a transceiver configured to perform communication with at least one external device;
a display configured to display the web page at the electronic device; and
at least one processor configured to:
set a group channel for sharing the web page based on port information received from the at least one external device,
control the transceiver to transmit information of the web page to the at least one external device through the group channel set by the electronic device to display the web page at the at least one external device,
in a case that the electronic device has a control authority after receiving the input of first control information regarding the web page, control the transceiver to transmit the first control information directly to the at least one external device through the group channel set by the electronic device before performing one of changing or editing the web page according to the first control information regarding the web page,
in a case that the electronic device does not have the control authority after receiving the input of first control information regarding the web page, disregard the first control information, control the transceiver to receive second control information regarding the web page from the at least one external device through the group channel set by the electronic device and perform one of changing or editing the web page according to the second control information, and
in response to receiving a forenotice signal from the at least one external device before receiving the second control information, control the display to display a notice message noticing a web page change before performing the one of changing or editing of the web page, the forenotice signal being a signal forenoticing the web page change.

13. The electronic device of claim 12, wherein, in response to the receiving of the input of first control information, the at least one processor is further configured to perform one of changing or editing the web page according to the first control information after transmitting the first control information to the at least one external device.

14. The electronic device of claim 13, wherein the first control information is input with the electronic device having one of the control authority or a control authority request not received from the at least one external device.

15. The electronic device of claim 13, wherein the at least one processor is further configured to, in response to the first control information being a changing manipulation for changing the web page, control the transceiver to:
transmit the forenotice signal for forenoticing the web page change to the at least one external device,
transmit the first control information corresponding to the changing manipulation to the at least one external device, and
control the display to change the web page according to the changing manipulation.

16. The electronic device of claim 12, wherein the at least one processor is further configured to, in response to a control authority request being received from the at least one external device, grant the control authority to the at least one external device that transmitted the control authority request.

17. The electronic device of claim 12, wherein the at least one processor is further configured to set a group by grouping the electronic device and the at least one external device.

18. The electronic device of claim 17, further comprising:
a storage,
wherein the at least one processor is further configured to:
- search for an available channel in response to the electronic device being a master apparatus,
- set the available channel to the group channel,
- store the available channel in the storage, search for the at least one external device through a common use channel,
- in a case that the at least one external device requests a group subscription, group the at least one external device in a same group as the electronic device, and
- store, in the storage, information received by broadcasting through the group channel from each of the at least one external device grouped in the same group.

19. The electronic device of claim 18, wherein the at least one processor is further configured to:
- in response to receiving a search signal from the at least one external device, transmit a response signal to the at least one external device that transmitted the search signal, and
- in response to a group subscription request being received from the at least one external device that received the response signal, add the at least one external device that requested the group subscription to the same group as the electronic device.

20. The electronic device of claim 12,
wherein the editing of the web page comprises at least one of a web page scroll control manipulation, text input manipulation, drag manipulation, or user's focusing related manipulation, and
wherein the changing of the web page comprises changing the web page to a new web page.

\* \* \* \* \*